United States Patent [19]

Naber

[11] 4,019,119
[45] Apr. 19, 1977

[54] DC TO AC VOLTAGE CONVERTER WITH AUTOMATIC START-STOP CONTROL OF MOTOR-GENERATOR SET

[75] Inventor: Joseph S. Naber, Marengo, Ill.

[73] Assignee: Applied Motors, Inc., Rockford, Ill.

[22] Filed: Apr. 1, 1976

[21] Appl. No.: 672,792

Related U.S. Application Data

[63] Continuation-in-part of Ser. No. 568,868, April 17, 1975, abandoned.

[52] U.S. Cl. .................................. 322/8; 321/28; 322/13; 322/16
[51] Int. Cl.² ..................... H02P 9/06; H02M 7/64
[58] Field of Search ............. 322/8, 10, 14, 13, 16; 321/28; 307/10 R

[56] References Cited
UNITED STATES PATENTS 3,665,502  5/1972  Means .................. 321/28

*Primary Examiner*—Robert J. Hickey
*Attorney, Agent, or Firm*—Leydig, Voit, Osann, Mayer & Holt, Ltd.

[57] ABSTRACT

The converter includes a dc. motor energizable from a battery and adapted to drive an alternator which produces an ac. output voltage for powering a load device. When the switch of the load device is closed or opened to start and stop the latter, the motor of the converter is automatically energized or de-energized. A unique system for controlling automatic energization and de-energization of the motor is constituted by low cost and reliable components and is characterized by a voltage divider and a diode circuit which (1) cause battery current to flow through a pick-up resistor to effect starting of the motor when the load device switch is first closed, and (2) limit the current through the resistor to small values when the alternator is operating.

29 Claims, 32 Drawing Figures

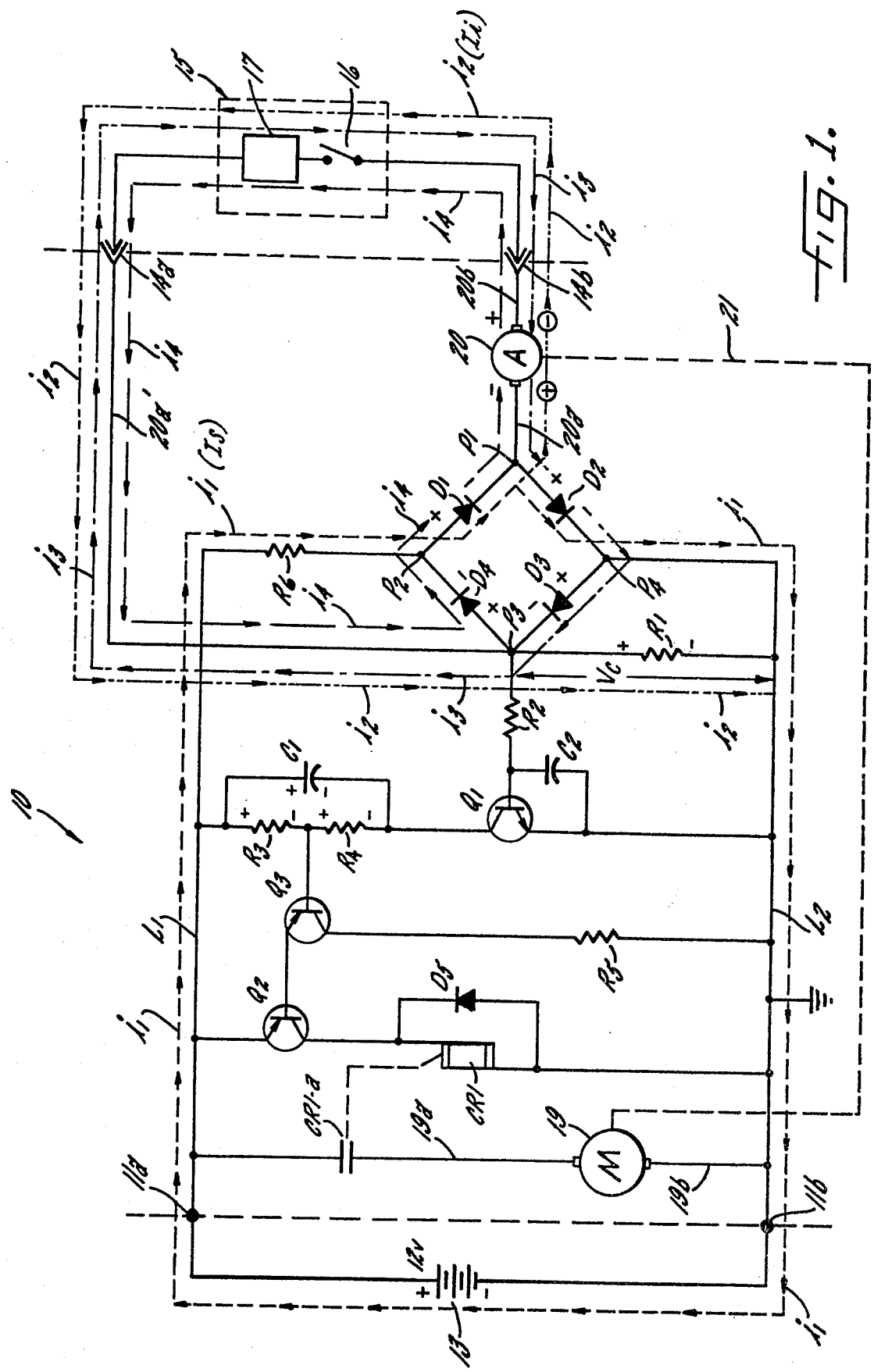

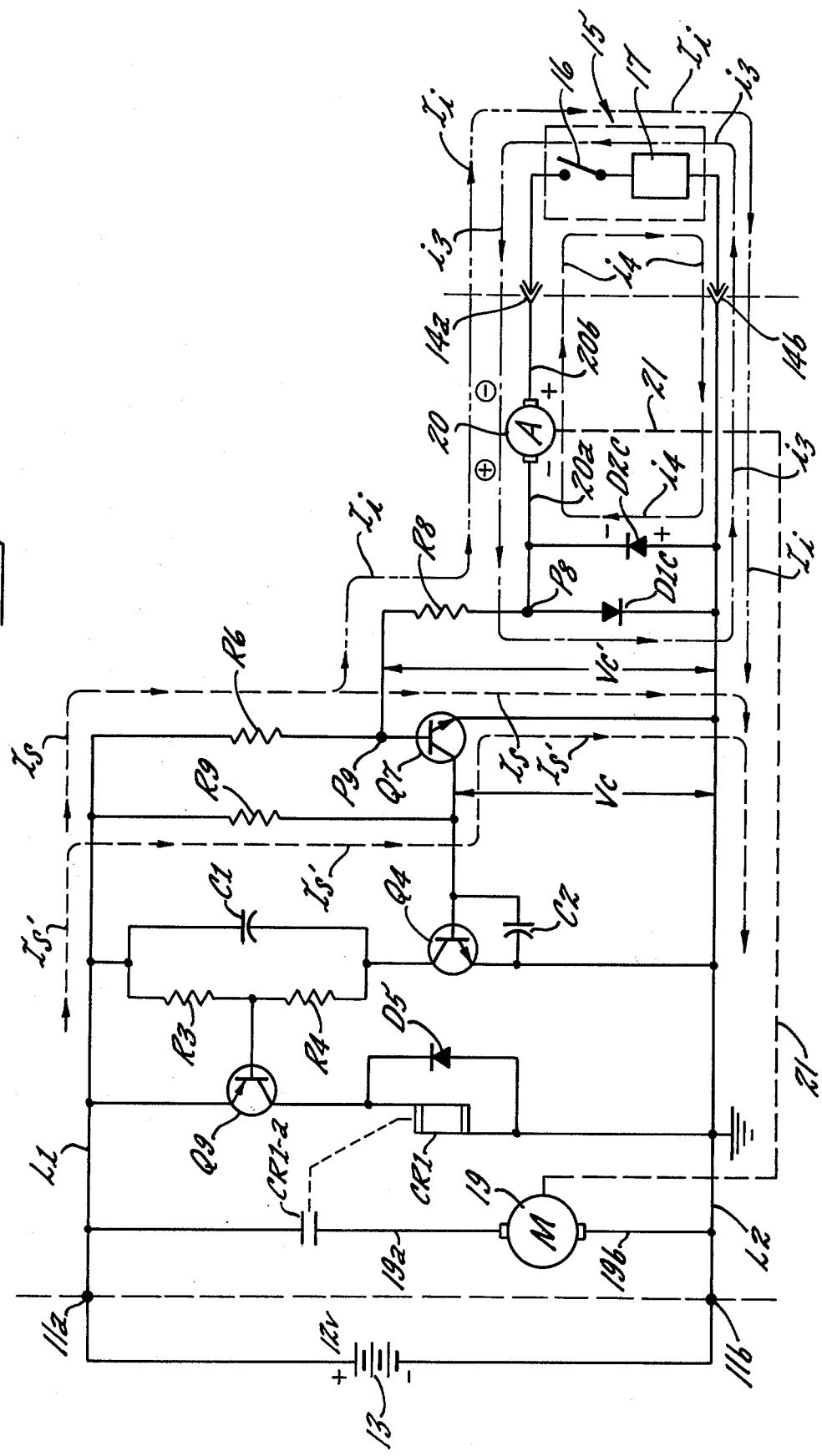

DC TO AC VOLTAGE CONVERTER WITH AUTOMATIC START-STOP CONTROL OF MOTOR-GENERATOR SET

CROSS REFERENCES TO RELATED APPLICATIONS

This application is a continuation-in-part of copending parent U.S. application Ser. No. 568,868 filed Apr. 17, 1975, now abandoned, and assigned to the assignee of the present case.

BACKGROUND OF THE INVENTION

This invention relates to a voltage converter system of the general type disclosed in Means U.S. Pat. No. 3,665,502. One of the embodiments disclosed in that patent comprises a motor-alternator set having a dc. motor energizable from a battery and having an alternator which produces an ac. voltage at its output. By connecting an ac. load device, such a tool with an induction motor, to the output of the converter, the load may be powered from the battery.

In many instances, such a motor-alternator converter is carried in a car, truck or boat and is connected to the battery thereof so as to provide the user with mobile electrical energy for operating a 120 or 240 ac. load device at a location where utility electric service is unavailable. To avoid needless drain on the battery, it is desirable to turn off the converter motor when the load device is not being operated. In the system disclosed in the aforementioned patent, the converter motor is turned on and off automatically whenever the load device is turned on and off by a switch associated with the load device. That prior system not only required that relay contacts be disposed in the ac. current path where they were subject to arcing and pitting, but also required that initial dc. current pass in series through the dc. motor as well as the load and alternator to create the start-up signal for the motor control.

SUMMARY OF THE INVENTION

The general aim of the present invention is to provide a new and improved dc. to ac. voltage converter system whose motor is adapted to be turned on and off automatically by the load device switch and whose components are lower in cost and more reliable in operation than the components of prior systems of the same general type.

A further object is to provide a system in which control of the motor may be effected with the use of a comparatively inexpensive and trouble-free relay having but a single set of contacts which carry only current from the battery.

A more detailed object is to provide a system in which the motor is energized in response to current flowing through a conductive pick-up element, the system including a voltage divider and a diode arrangement for limiting the current through the pick-up element to a low value during operation of the alternator.

Still another object of the invention is to create an improved automatic start-stop control system for a motor-alternator set, characterized in that a small standby trickle current is drawn from the battery or dc. source through a semi-conductor junction—and which permits closure of the load device switch to produce a signal change which turns on the motor.

It is another object to provide such an arrangement in which the ac. current generated by the alternator, when the motor is running, is passed forwardly during alternate half cycles repectively through at least first and second semiconductor diodes which are permanently connected in the circuitry—and wherein the pulsating voltage produced across at least one of said diodes due to such current flow is utilized to assist in maintaining the motor energized until the flow is terminated by opening of the load switch.

In some installations, the stray capacitance between conductors of a long extension cord (leading from the alternator to the load) or unswitched load capacitance (for example, that of a radio frequency filter) exists as a current-drawing impedance on the operating alternator even after the load device switch is opened. It is an object of the present invention to prevent such continued flow of ac. current from causing the control system to fail to turn off the motor after the load device switch is opened. For brevity, this may be designated as a feature for prevention of turn-off failure.

These and other objects and advantages of the invention will become apparent from the following detailed description taken in conjunction with the accompanying drawings.

BRIEF DESCRIPTION OF THE DRAWINGS

FIG. 1 is a schematic diagram of an exemplary voltage inverter system embodying the certain features of the invention.

FIGS. 4 and 4A, 4B, 4C are similar to FIGS. 3 and 3A–3C but illustrate a fourth embodiment.

Figure 1A:
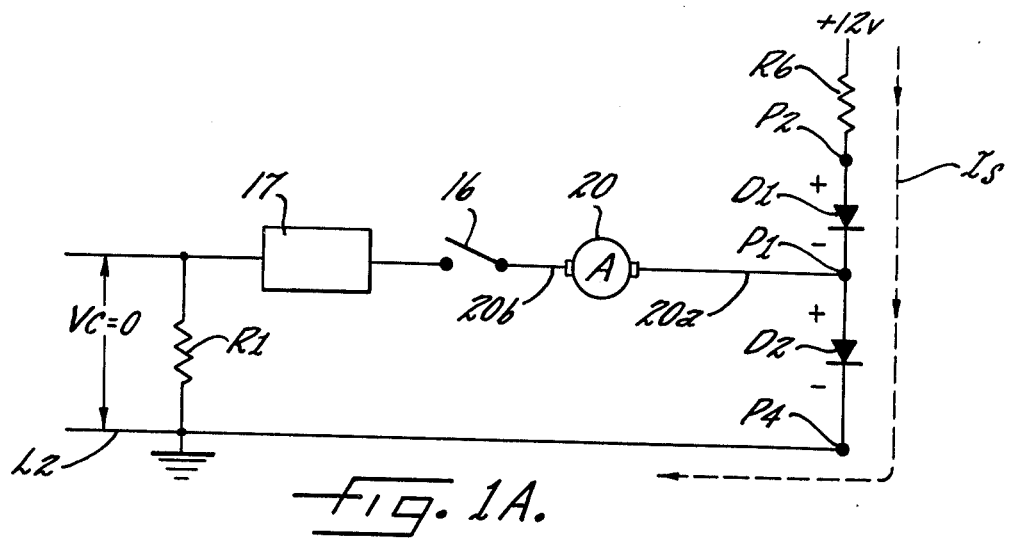
FIGS. 1A, 1B, 1C are fragmentary schematics corresponding to portions of FIG. 1 but drawn with different layouts to facilitate understanding of the system operation under different circumstances.

While the invention has been shown and will be described in some detail with reference to different specific and exemplary embodiments, there is no intention that it be limited to such detail. On the contrary, it is intended here to cover all modifications, alternatives and equivalents which fall within the scope of the appended claims.

DETAILED DESCRIPTION OF THE PREFERRED EMBODIMENTS

A first, exemplary embodiment of a dc. to ac. voltage converter apparatus 10 incorporating the features of the invention includes input terminals 11a, 11b (FIG. 1) adapted to be removably connected to any suitable dc. source such as a battery 13. The battery may typically and for example be a conventional automotive or truck battery providing an output voltage of 12 volts dc. and having a storage capacity of some 60 to 200 ampere-hours.

The converter apparatus 10 further includes output terminals 14a and 14b adapted for connection to an electrical load device 15 which consists of a series on-off switch 16 and a motor, transformer or other load unit 17 energizable by ac. voltage. As a concrete example, the load device 15 might be an electric power tool in which the unit 17 is an induction motor rated for operation with an input voltage of 120 volts ac. The load device may be connected to the output terminals 14a and 14b by a standard plug and socket coupling and a relatively long extension cord permitting the device to be operated at a considerable distance from the converter apparatus 10. For simplicity of illustration, the load device has been shown as plugged directly into the output terminals 14a and 14b, which herein are incorporated in a socket.

Herein, the principal converter apparatus is shown as a motor-alternator set constituted by (a) a dc. motor 19 having input leads 19a, 19b connectable via relay contacts CR1-a to the input terminals 11a, 11b and (b) an alternator 20 having output leads 20a, 20b connected (via components to be described) to the output terminals 14a, 14b. The motor and alternator may be physically separate units of conventional organization with armatures mechanically coupled by a shaft 21 or they may have their rotor windings mounted on a common rotor journaled within a common stator. The motor is rated for operation from the voltage (e.g., 12 volts dc.) provided by the battery 13 whereas the alternator is designed and rated to produce (when driven at rated speed by the motor) an output voltage substantially corresponding to the rated operating voltage (e.g., 120 vac. at approximately 60 Hertz) of the load device unit 17.

A control system for the converter apparatus 10 is the subject of the present invention and is adapted to cause energization and de-energization of the motor 19 whenever the on-off switch 16 is closed or opened to start or stop the load device unit 17. In this instance, the control system includes normally non-conductive switching means which are connected across first and second lines L1 and L2 in a series circuit extending between the input terminals 11a, 11b through the motor 19, so that the battery 13 (when connected as shown) is in series with the switching means and the motor. Because the negative post of battery 13 is connected to line L2 the latter is conveniently considered as residing at a reference or ground potential. More particularly, the aforementioned series circuit extends from the positive terminal or post of the battery through the terminal 11a and line L1, normally open switching contacts CR1-a controlled by a relay coil CR1, the motor 19, the line L2 and finally the input terminal 11b back to the negative terminal or post of the battery. When the contacts CR1-a are open or closed, the motor will be disconnected or connected across the battery 13 and de-energized or energized by current flow from the battery. Of course, a solid state relay may be used for the motor switching means as a well known substitute for the electromagnetic relay CR1.

The relay coil CR1 is connected between the lines L1 and L2 in a manner such that it may be selectively energized or deenergized. As here shown, the relay coil is controlled by an NPN transistor Q1 having its collector and emitter control terminals connected to the lines L1 and L2, respectively. Whenever a plus-to-minus voltage drop Vc (as labeled) of sufficient magnitude is produced across a conductive resistance element R1 by virtue of a plus-to-minus current flow through that element, current flows through a current-limiting resistor R2 and through the base-emitter junction of the transistor to turn the latter on (i.e., render the transistor conductive) so that the battery 13 may drive collector current in the collector-emitter path through series resistors R3 and R4. When the control voltage Vc across the resistor R1 falls below a predetermined magnitude, or indeed goes to zero or swings negative, the transistor is turned off and thus current does not flow in the collector-emitter path. For illustrative purposes and to facilitate the following description, it will be assumed that 0.4 volts is the threshold value of voltages Vc required to turn on the transistor Q1.

While the relay coil CR1 could be connected in series in the collector-emitter path of the transistor Q1 and energized by current in that path, the coil herein is serially connected with the emitter-collector terminals of a PNP transistor Q2 which is coupled with another PNP transistor Q3 to form a Darlington pair for the purpose of providing extra current amplification. The base of the transistor Q2 is connected to the emitter of the transistor Q3 while the base of the latter is connected to the junction between the resistors R3 and R4. The collector terminal of the transistor Q3 is connected to the line L2 through a resistor R5.

When the transistor Q1 is turned on, the current which flows in its collector-emitter path produces a voltage drop across the resistor R3 to cause current to flow through the emitter-base junctions of the transistors Q2 and Q3 to turn those transistors on. When the transistor Q3 turns on, current is drawn via the base of transistor Q2 through the resistor R5 and renders the transistor Q2 even more conductive, so that current of relatively high value flows in the emitter-collector path of that transistor and energizes the relay coil CR1 to close the relay contacts CR1-a.

As will be explained subsequently in more detail, the transistor Q1 is repeatedly turned on and off during operation of the alternator 20 but remains in a given on or off state for only a very short interval. In order to prevent the relay CR1 from dropping out when the transistor Q1 is momentarily off, a capacitor C1 is connected in parallel wth the resistors R3 and R4 and is adapted to be charged by the collector-emitter current of the transistor Q1 each time the latter is turned on. When the transistor Q1 is momentarily turned off, the capacitor discharges through the resistors R3 and R4, thereby maintaining the voltage drop across the resistor R3. This holds the transistors Q2 and Q3 on and the coil CR1 energized even though the transistor Q1 is not momentarily conducting current through its collector-emitter path. If the transistor Q1 remains off for more than a short interval, the capacitor is not immediately recharged and thus the transistors Q2 and Q3 are turned off, de-energizing the relay coil CR1 as soon as the last-imposed capacitor charge has dissipated. When current flow to the relay coil CR1 is abruptly terminated by turn-off of the transistor Q2, a diode D5 in parallel with that coil conducts to absorb the reverse voltage (flyback kick) induced in the coil.

Current of small magnitude flows from plus-to-minus through the resistor R1 to turn on the transistor Q1 and effect starting of the motor 19 whenever the on-off switch 16 of the load device 15 is initially closed. In keeping with the invention, a pulsating current flow of comparatively small magnitude is maintained in the resistor R1 after the alternator starts up and begins sending alternating current through the load device.

In accordance with the present invention, means are provided to draw a standby trickle dc. current from the battery 13 when the motor-alternator set is idle, i.e., when switch 16 is open and the motor 19 is not running so that the alternator output voltage and current are zero. Such means include a current limiting resistor and a forwardly poled semiconductor junction which are permanently connected across the lines L1, L2 and thus across the battery 13. The resultant forward voltage drop across the semiconductor junction is relatively low (e.g., about 0.5 to 0.7 volts) and is continuously ready to be utilized for creation of the voltage Vc to control the motor 19.

Further, means are connected to the semiconductor junction to provide initial dc. current flow through the alternator 20, the load unit 17 and the switch 16 whenever the latter is first closed (and prior to the motor 19 being accelerated up to normal operating speed). Means responsive to such initial current act to energize the motor 19 from the battery 13. More specifically, such initial dc. current is passed through the conductive pick-up element constituted by the signal resistor R1 so as to make the control voltage Vc sufficiently large and positive that transistor Q1 is turned on (thereby causing relay contacts CR1-a to close and energize the motor in the manner noted above).

In the embodiment of FIg, 1, the foregoing is achieved by a voltage divider connected between the lines L1 and L2 and comprising the series combination of a current limiting resistor R6 and two semiconductor diodes D1 and D2. Each of the diodes D1 and D2 is forwardly poled to conduct current from the line L1 to the line L2. Thus the tie point P1 between the diodes resides at one "forward voltage drop" above the potential of the line L2. That is, if the diode D2, which forms the semiconductor junction mentioned above, requires and creates a given voltage drop in order to conduct current in a forward direction, that voltage is considered to be a "forward voltage drop". Merely as an example to facilitate explanations herein, it will be assumed that one forward voltage drop is 0.5 volts, although the exact value will be different for different types of diodes and will fall within a manufacturing tolerance range for any particular type. It is to be remembered that if a semiconductor junction or dioed is conducting forwardly, the voltage drop thereacross remains essentially constant even though the magnitude of the current flowing through the diode varies over a wide range.

To create initial current flow, a first series circuit is established from the point P1 through the alternator lead 20a, the alternator 20, and the alternator lead 20b, and thence through the output terminal 14b, the on-off switch 16 and the unit 17 of the load device 15. Such first series circuit continues back to the line L2 through the output terminal 14a, a lead 20a', tie point P3 and signal resistor R1 to line L2 (which is the same as ground and point P4). It is to be noted that a diode D3 is in parallel with resistor R1 between junctions P3 and P4, but it is reversely poled with respect to current flow from P3 to P4.

In completing the control system, means are provided for conducting ac. current generated by the alternator 20 (when the latter is rotating and switch 16 is closed) through the load unit 17, switch 16 and at least two semiconductor diodes which respectively conduct forwardly the respective positive and negative half cycles of such current. And means responsive to the pulsating forward drop across at least one of said diodes function to maintain the motor 19 connected across the battery 13 so long as the switch 16 remains closed.

More particularly in the embodiment of FIG. 1, a second series circuit is established from the point P1 through alternator 20, switch 16, and load unit 17, and thence via a forwardly poled semiconductor diode D4 between points P3 and P2, and then via diode D1 to point P1 and alternator lead 20a. Diodes D4 and D1 therefore forwardly conduct during those half cycles of generated current which flow when alternator lead 20b is positive relative to lead 20a (uncircled polarity symbols). On the other hand, a third series circuit is created by diodes D2 and D3 which carry current forwardly on the opposite half cycles (when the alternator voltage has the polarity of the circled symbols). The latter series circuit extends from lead 20a via P1, D2, P4, D3, P3, 20a', 17, 16 and 20b back to the alternator. It is to be observed that the circuit components for conducting positive and negative half cycles of ac. current are permanently connected, i.e., involve no switching contacts or controlled transistors. The diodes D1 and D4 carry positive half cycles of ac. current; the diodes D2 and D3 carry negative half cycles of ac. current.

The resistor R1 extends between the line L2 and the point P3, i.e., in parallel with diode D3 between points P3 and P4. Therefore, the control voltage Vc appearing across signal resistor R1 when the alternator 20 is operating is determined by the pulsating voltage drops across diodes D1, D2, D3, D4 in the manner to be explained below and such that transistor Q1 is periodically turned on to keep relay CR1 steadily energized.

Figure 1B:
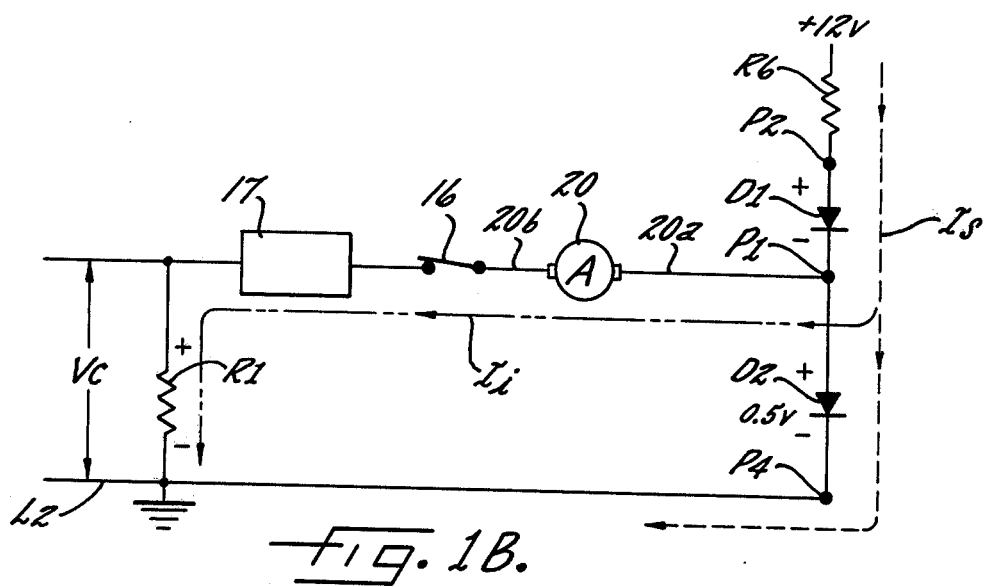
Figure 1C:
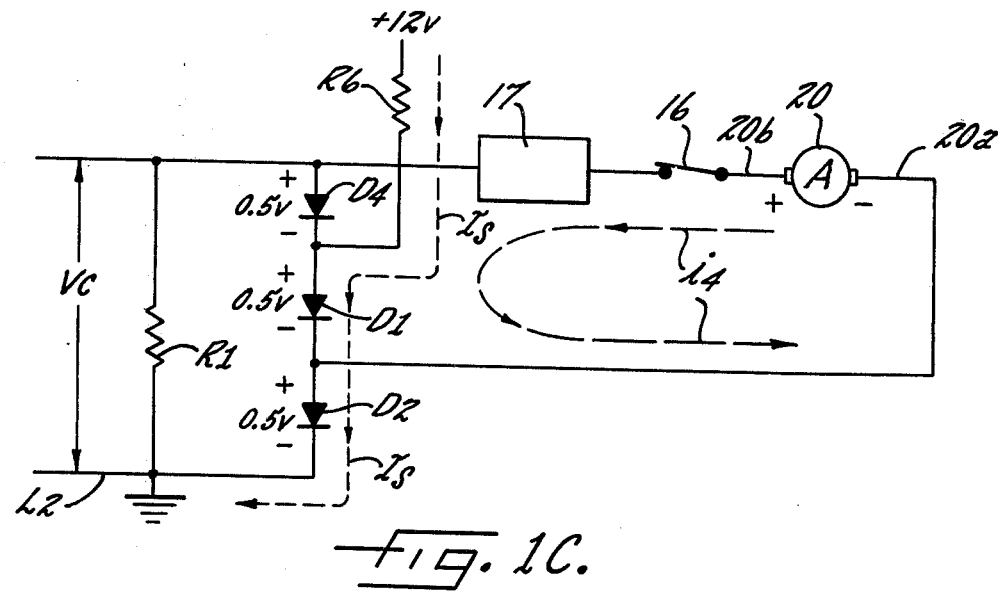

The operation of the foregoing arrangement may now be understood, particularly with the assistance of FIGS. 1A, 1B and 1C. Assume first that the system is in standby. With the battery 13 connected as shown, a dc. trickle current $i_1$ (also designated $I_s$) flows from line L1 via resistor R6 through diodes D1 and D2 to line L2. FIG. 1A shows the then operative portions of the circuit, confirming that the standby current $I_s$ flows forwardly through diodes D1 and D2, the latter being formed by a semiconductor junction or an equivalent Schottky barrier. The resistor R6 is preferably given a high ohmic value (e.g., 330 ohms if battery 13 provides 12 volts) so that the trickle current $I_s$ is on the order of 35 milliamperes and does not significantly deplete the battery even if it flows for many hours between times when the battery is recharged. Yet, such trickle standby current creates one "forward voltage drop" of the indicated polarity across each of diodes D1 and D2, the magnitude here being assumed to be 0.5 volts for the sake of discussion. This means that point P1 resides at +0.5 volts relative to ground (line L2) and that diode D2 creates a voltage which can drive initial current through signal resistor R1 if and when switch 16 is closed. In the standby condition represented by FIG. 1A, however, switch 16 is open and no current flows through resistor R1 so that voltage Vc is zero, transistor Q1 is turned off, and motor 19 is de-energized. Observe from FIG. 1 that under these conditions, diodes D4 and D3 are reversely biased and non-conductive, so they are not shown in FIG. 1A.

When the switch 16 is first closed, the standby current $I_s$ continues to flow through diodes D1 and D2. But the completed series circuit which includes switch 16 has the forward drop across diode D2 as its active source voltage, so initial dc. current $I_t$ now flows along the path $i_2$ (FIG. 1) from P1 via 20a, 20, 16, 17, 20a-' and R1 to P4. This condition is illustrated in FIG. 1B. The 0.5 volts across diode D2 acts as an imaginary battery driving current $I_t$ through the alternator 20, switch 16, load unit 17 and resistor R1 to ground (P4). The dc. resistance of the alternator is extremely low; that of most ac. load units 17 is very low (e.g., from 0.1 ohm to about 200 ohms); and the resistance value of resistor R1 is chosen to be relatively high (e.g., 1000 ohms). Thus, the initial current $I_s$ through resistor R1 makes the control voltage Vc an appreciable fraction (e.g., about 0.4 volt or more) of the "one forward drop" (e.g., 0.5 volt) which exists across diode D2. This exceeds the base turn-on threshold potential for transistor Q1—which then conducts collector current sufficient to draw current through R3, R4 and turn on transistors Q3, Q2—so relay CR1 is energized and contacts CR1-a closed to start the motor 19.

As the motor accelerates to normal speed (chosen, for example, to make the output frequency of alternator 20 nominally 60 Hertz), ac. current is supplied by the alternator through the load unit 17 and the closed switch 16. During positive half cycles (arbitrarily, when the alternator lead 20b is positive relative to lead 20a) the ac. current (indicated by $i_4$ in FIGS. 1 and 1C) flows forwardly through diodes D4 and D1. This produces only one forward voltage drop (e.g., about 0.5 volt) across each such diode regardless of the magnitude of the load current (even, for example, if it is 10 or 20 amperes), and thus does not appreciably detract from the alternator voltage applied to load unit 17. But the pulsating forward voltage drops across diodes D4 and D1 during such positive half cycles periodically drive the voltage Vc above the threshold required to turn on transistor Q1.

As illustated in FIG. 1C, when a positive half cycle of ac. current $i_4$ is flowing, it creates a forward diode drop across diode D4 (as well as diode D1). Diode D2 remains forwardly conductive due to the standby trickle current $I_s$. Thus, the voltage $V_c$ across signal resistor R1 is the sum of the three forward voltage drops, and in the assumed example is equal to +1.5 volts. In the circumstances shown by FIG. 1C, therefore, the transistor Q1 is turned on, and the capacitor C1 (FIG. 1) is charged—to keep the relay CR1 and the motor 19 energized. Noteworthy is the fact that diode D3 is reversely biased by 1.5 volts during positive half cycles of ac. current, and thus it is properly omitted from the explanatory circuit of FIG. 1C.

During negative half cycles of ac. current supplied through the load unit 17 by the alternator 20 (when lead 20b is negative relative to lead 20a) the ac. current $i_3$ flows forwardly through diodes D2 and D3 and hence through unit 17 and switch 16 back to the alternator. From FIG. 1 it will be apparent that the alternator voltage reversely biases diode D4 which thus becomes non-conductive. Also, the single forward voltage drop across diode D3 is applied to resistor R1, making control voltage Vc negative (e.g., −0.5 volt). This turns off transistor Q1 during such negative half cycles of ac. current. But it is to be recalled that discharge of the previously charged capacitor C1 keeps the base of transistor Q3 negative relative to the emitter of transistor Q2—so that they remain conductive and relay CR1 does not drop out.

Thus, the diode D4 contributes to making the voltage Vc rise above the positive turn-on threshold of transistor Q1 by its pulsating voltage drop during positive half cycles of load current, and such forward drop is added to the two forward voltage drops across diodes D1 and D2. If it is assumed that the motor 19 drives the alternator 20 at a speed which causes the alternator frequency to be 60 Hertz, the transistor Q1 responds to the pulsating voltage drop across diode D4 to turn on 60 times per second, so that capacitor C1 is repeatedly recharged before the relay CR1 can drop out.

When the on-off switch 16 is opened to turn off the load device unit 17, the three series circuits for the currents $I_t$, $i_3$ and $i_4$ are interrupted. The full output voltage of the alternator 20 appears momentarily across the open switch 16 but the currents $i_2$, $i_3$ and $i_4$ cannot flow. Therefore, the voltage drop Vc across the resistor R1 falls to zero, and the transistor Q1 is turned off. After a very short time for the discharge of capacitor C1, the transistors Q2 and Q3 turn off and de-energize the relay coil CR1 to open the contacts CR1-a and de-energize the motor 19. Both the motor and the alternator stop, — and the system returns to a standby condition ready for re-activation when switch 16 is next closed.

The foregoing arrangement enables the motor 19 to be started and stopped automatically as an incident to closing and opening of the on-off switch 16 of the load device 17. The user of the load device (at the end of a long extension cord) need not walk back and forth to the motor-alternator set to turn it on and off; yet the motor does not run at idle load to needlessly run down the battery during long or short periods when an operator is not actually using the load device 15. The resistor R1 defines a signal pick-up element which creates a steady positive control signal Vc from the initial current $I_t$ created by the forward voltage drop across diode D2 immediately when the switch 16 is first closed, and which thereafter creates a pulsating positive control signal Vc from three forward drops across diodes D4, D1, D2 during alternate half cycles of the current generated by the alternator 20 so long as switch 16 remains closed. Means in the form of the transistors Q1, Q3, Q2 and the capacitor C1 respond to both the steady and pulsating positive voltage Vc across resistor R1 to cause closure of the relay contacts CR1-a to start the motor 19 and to keep the motor running until the switch 16 is opened.

Noteworthy is the fact that the relatively high current (e.g., 10 amperes) drawn from the alternator 20 by the turned-on load device 15 does not flow through the signal resistor R1. Instead, the current through the resistor R1 is limited to that resulting from one diode drop (i.e., the voltage drop across the diode D3) during negative half cycles of ac. load current and three diode drops (i.e., the sum of the voltage drops across the diodes D4, D2 and D1) during positive half cycles of such current. Characteristically, the forward resistance of each diode is very low and, once the diode starts conducting, its forward voltage drop is low and constant irrespective of the magnitude of the forward current. If it is assumed that the forward drop across each diode is on the order of 0.5 volt and that the resistor R1 has a high resistance value, the current through resistor R1 is almost negligible since the maximum voltage applied thereto is 1.5 volts.

Importantly, no dc. current of any substantial magnitude passes through the load unit 17 because the initial current $I_t$ is limited to a low value by virtue of the fact that a maximum of one forward drop voltage (across D2) is applied to the series combination of alternator 20, load limit 17 and resistor R1. Thus, if the load unit 17 is one which includes iron-core inductive elements, dc. saturation of those elements is avoided and the dc. current bias on the ac. load current is essentially negligible. The arrangement of diodes D1 to D4, although they are permanently connected, prevents ac. current of any substantial magnitude from passing through the battery 13 and producing spurious heating therein. This isolation of ac. current from the battery results because the ac. voltage in the circuit which includes lines L1, L2 is a maximum of 1.5 volts or 0.5 volt on positive and negative half cycles, and because the high valued resistor R6 permits only negligible pulsating current to result in the battery 13.

SECOND EMBODIMENT

Figure 1D:
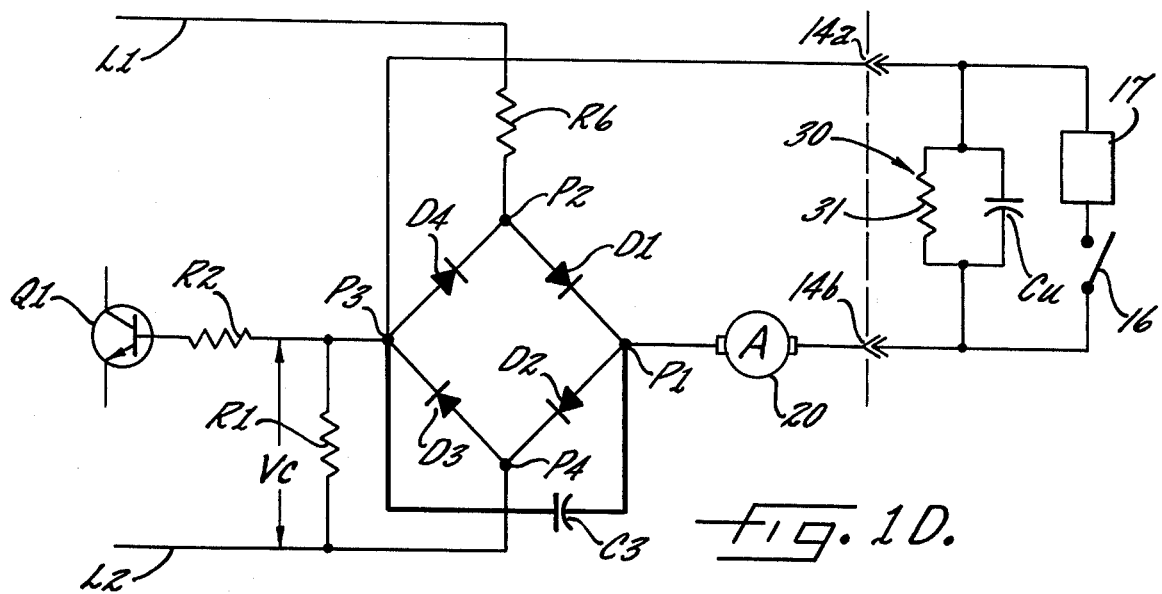
FIGS. 1D, 1E, 1F are partial schematics of a system like that of FIG. 1, but illustrate the manner in which turn-off failure may occur if unswitched load capacitance is present, and the addition of means to prevent such turn-off failure.
Figure 1E:
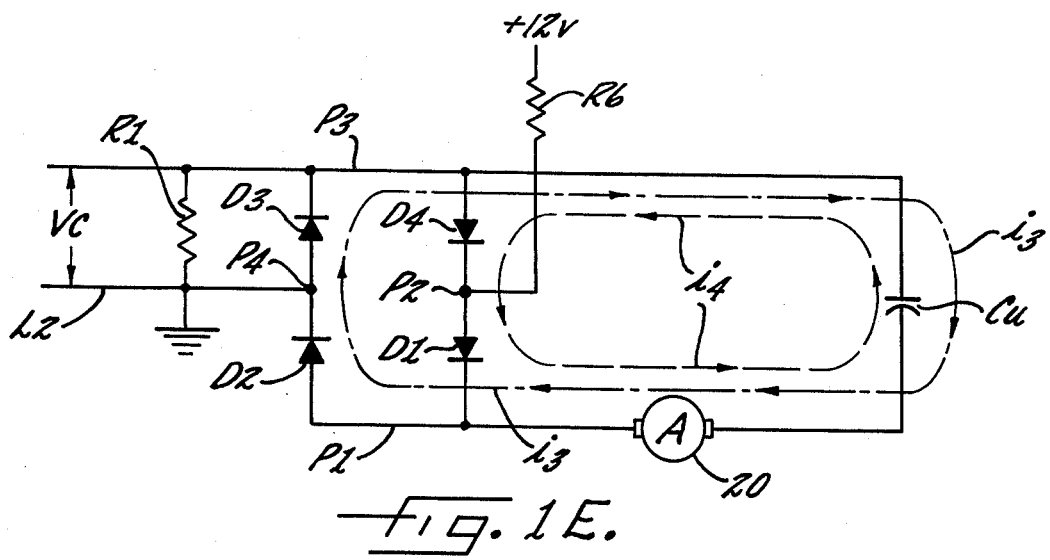
Figure 1F:
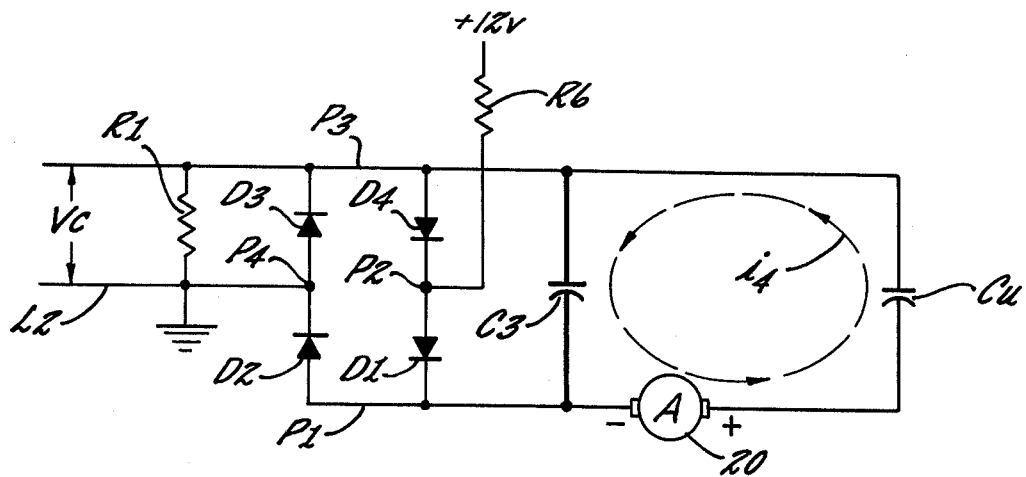
Figure 1G:
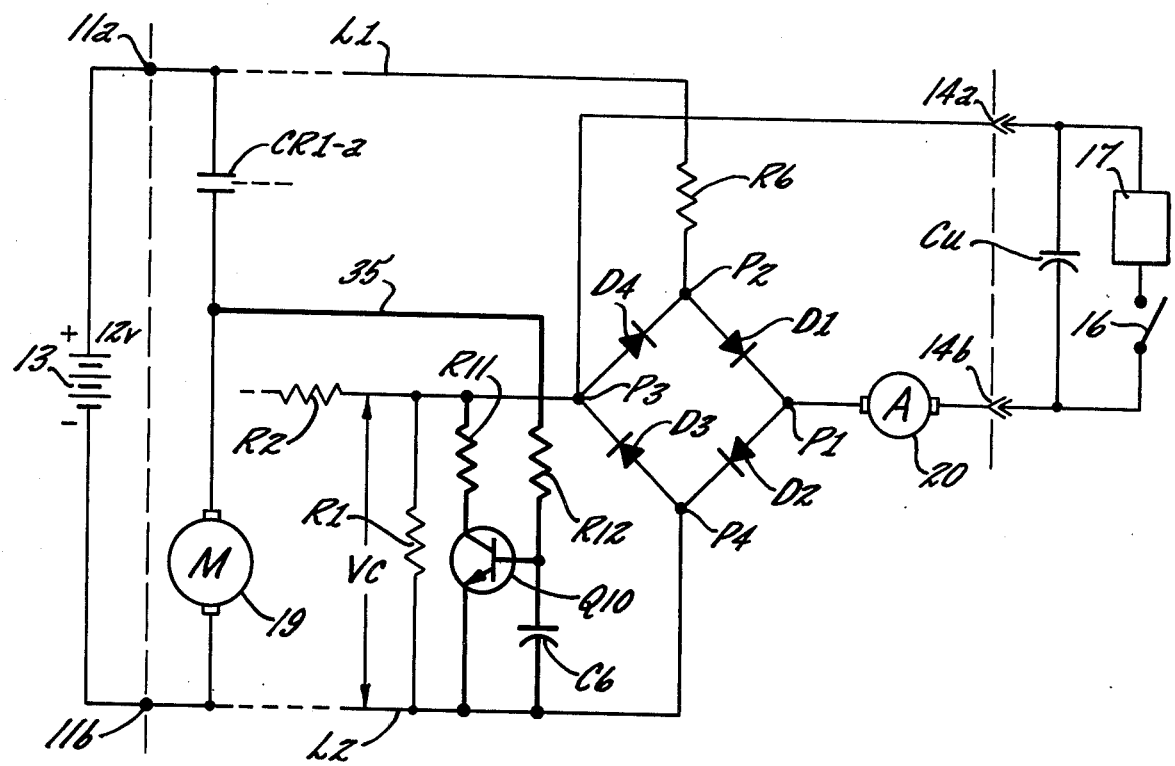
FIGS. 1G and 1H illustrate an alternative turn-off failure preventing means added to the embodiment of FIG. 1.
Figure 1H:
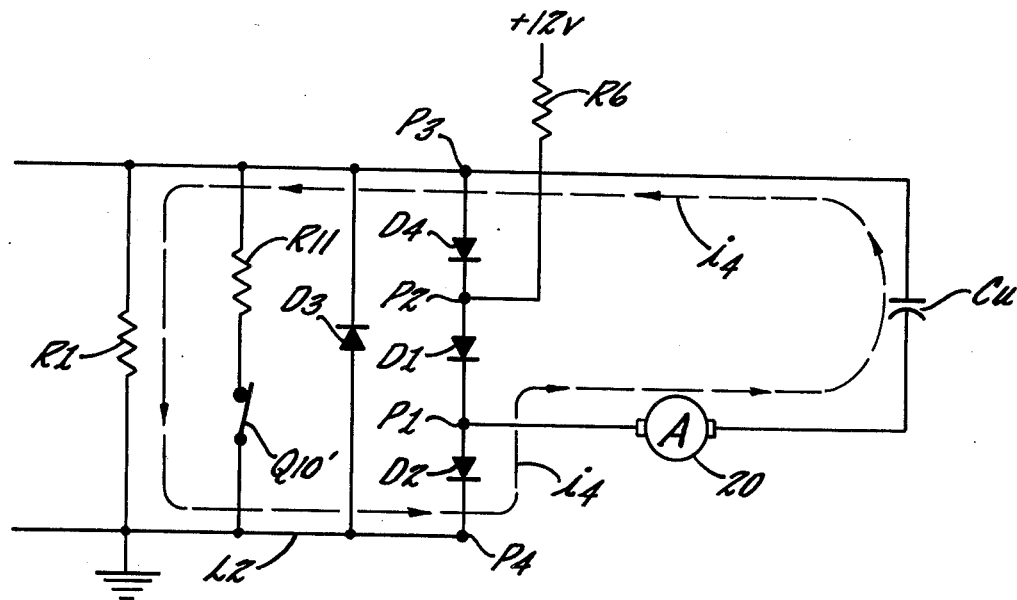
Figure 2:
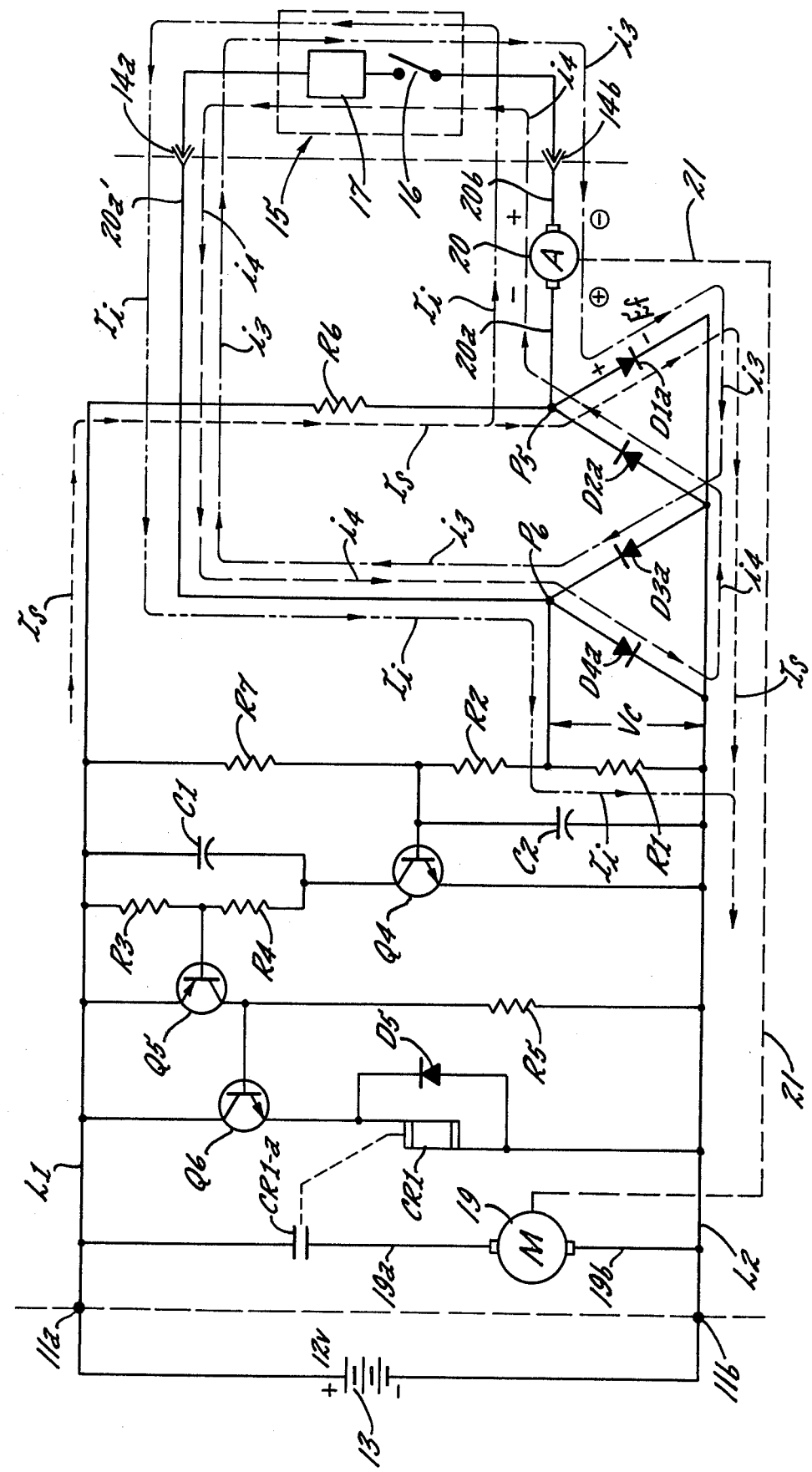
FIGS. 2 and 2A, 2B, 2C are similar to FIGS. 1 and 1A–1C but illustrate a second embodiment.

In FIG. 2, like parts are identified by the same reference characters as in FIG. 1, and thus only the differences between FIGS. 1 and 2 need be described.

In FIG. 2, the control voltage Vc appears across a signal resistor R1 which is in the base-emitter circuit of a transistor Q4. Resistors R7, R2 and R1 form a voltage divider between lines L1 and L2 to pre-bias the base of Q4 to a slightly positive potential of about +0.2 volts but this is insufficient to render the Q4 collector path conductive in the standby condition. If (as hereafter explained) the control voltage Vc rises above a threshold of about +0.4 volts, however, then Q4 turns on, so that the emitter-base junction of a transistor Q5 is biased forwardly to send collector current through resistor R5 and the base-emitter junction of transistor Q6, thereby enabling collector current to flow through relay CR1. This closes contacts CR1-a and turns on the motor 19.

Figure 2A:
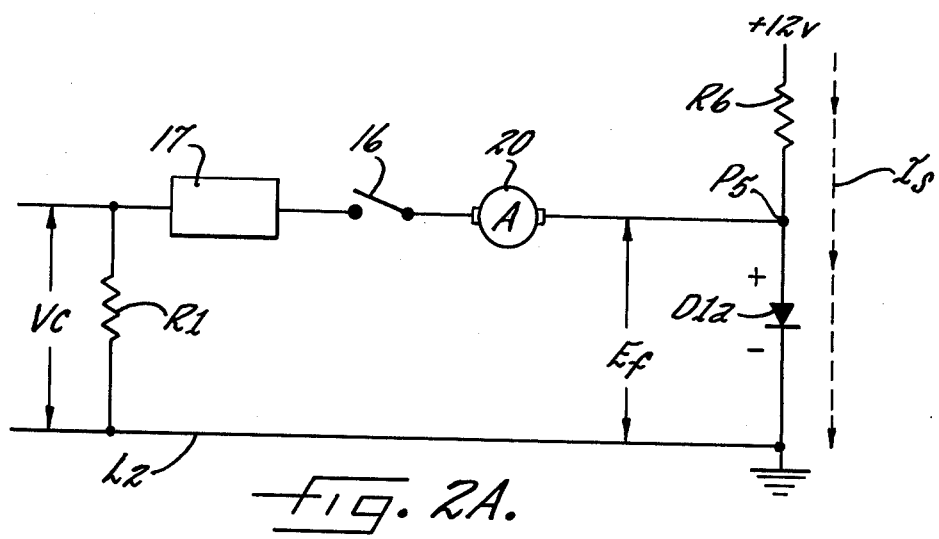

As a means for drawing trickle current $I_s$ from the battery 13 during standby in FIG. 2, a voltage divider is established by the current limiting resistor R6 and a forwardly poled semiconductor junction, in the form of a diode D1a, connected in series between lines L1 and L2. Although a second diode D2a is in parallel with diode D1a, the former is oppositely poled and non-conductive when standby current $I_s$ flows through R6 and D1a to create across the latter one forward voltage drop Ef making a tie point P5 positive relative to the ground potential of line L2. FIG. 2A illustrates the operative components of FIG. 2 in the standby condition and confirms that, with switch 16 open, the standby current $I_s$ through diode D1a makes point P5 reside at one forward drop (e.g., 0.5 volt) positive.

Figure 2B:
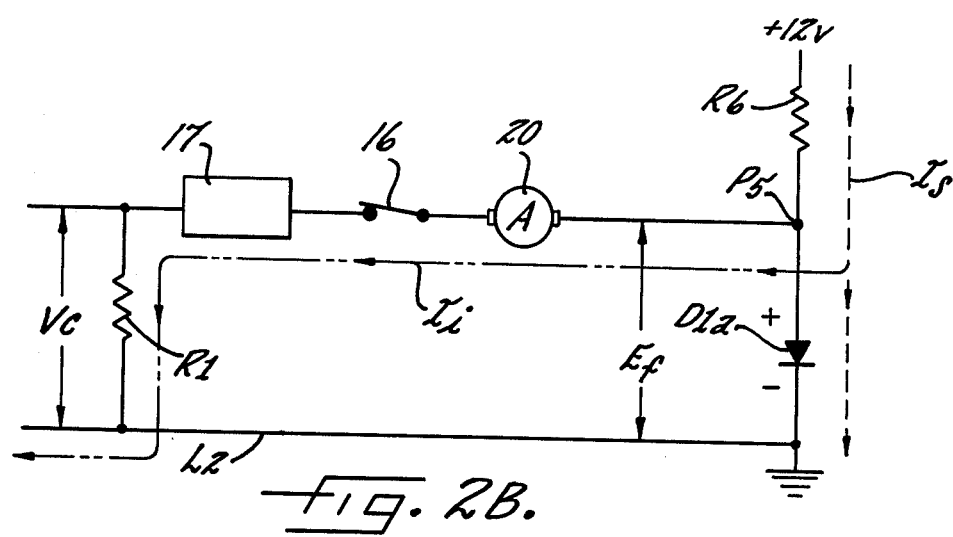

The leads 20a, 20b of the alternator 20 are connected via output terminals 14a, 14b and load device 15 by means for carrying an initial dc. current through alternator 20, unit 17 and switch 16 when the latter is closed. As shown in FIG. 2, there is a series circuit from point P5 (anode of D1a) via alternator 20, switch 16, unit 17, lead 20a', point P6, and resistor R1 to L2 (cathode of D1a). Thus, when switch 16 is closed, initial current, as labeled at $I_i$, flows in such circuit because of the voltage Ef. This increases the control voltage Vc from the pre-bias value of about +0.2 volt to about +0.4 volt and raises the potential of the base of transistor Q4 sufficiently to turn on the latter —thereby starting the motor 19. The path of the initial current $I_s$ is seen more readily in FIG. 2B which illustrates the series circuit therefor immediately after switch 16 is closed. It will be apparent that the resistor R1, the transistors Q4, Q5, Q6 and the relay CR1 all constitute a means responsive to the initial current $I_s$ for energizing the motor.

The embodiment of FIG. 2 also includes permanently connected means for conducting ac. current generated by the alternator 20 when switch 16 is closed. Such means are here formed by diodes D4a and D2a which conduct forwardly during positive half cycles of ac. current $i_4$; and by diodes D1a and D3a which conduct forwardly during negative half cycles of current $i_3$. Diodes D1a and D2a are connected with opposite polarization between point P5 and line L2; whereas diodes D4a and D3a are connected with opposite polarization between point P6 and line L2. The alternator 20 and the load device 15 are in series between the points P5 and P6; and it is apparent that diode D4a is in parallel with the signal resistor R1.

Figure 2C:
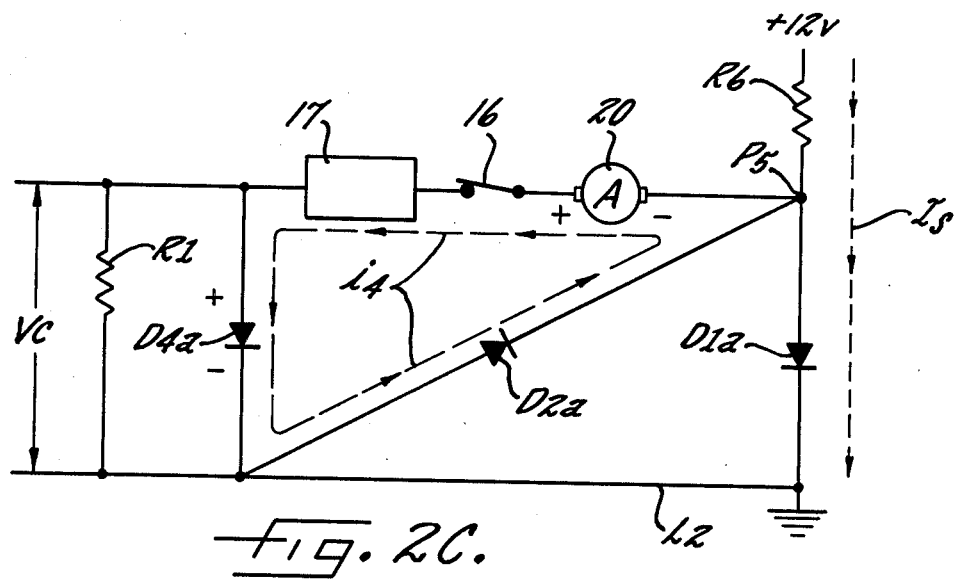

In operation, therefore, when alternator lead 20b is positive relative to lead 20a, the positive half cycle of ac. current flows in the path labeled $i_4$. Diodes D3a and D1a are non-conductive, and thus are omitted from the simplified diagram of FIG. 2C which illustrates the positive half cycle of the alternator 20. Diodes D4a and D2a carry ac. current forwardly, and thus the full forward voltage drop (+0.5 volt) across the former appears as the positive control voltage Vc —which causes turn-on of transistor Q4 and charging of the capacitor C1. The pulsating forward drop across diode D4a on positive cycles of ac. current acts via Q4, Q5, Q6 and CR1 to maintain the motor 19 connected across the battery 13.

On negative half cycles of ac. current from the alternator diodes D4a and D2a are reversely biased and non-conductive. But diodes D1a and D3a carry the negative half cycles of current, labeled $i_3$, forwardly. The 0.5 volt forward drop across diode D3a makes the control voltage Vc negative and cuts off the transistors Q4. But during these intervals, the capacitor C1 discharges to keep transistors Q5 and Q6 turned on, so the relay CR1 does not drop out.

When switch 16 is opened, however, the ac. current is interrupted, and the initial current $I_i$ cannot flow. Capacitor C1 discharges and is not recharged because Q4 is not steadily or periodically conductive. Thus, transistors Q5 and Q6 turn off, and relay contacts CR1-a open to turn off the motor 19.

The arrangement of FIG. 2 serves to start or stop the motor 19 when the load switch is closed or opened. As in FIG. 1, only a trickle of dc. current $I_t$ flows through the load device 15, and no appreciable saturation of iron core elements (e.g., transformers or induction motors) occurs. The very minor coupling of the ac. current into circuit of the dc. battery circuit is through a voltage applied to the signal resistor R1, and this alternates between the very low values of plus and minus one diode forward voltage drop (±0.5 volt) when the alternator is operating. None of the ac. load current flows directly through the battery. This very slight intercoupling between the ac. and dc. circuits makes FIG. 2 a preferred embodiment over that of FIG. 1.

THIRD EMBODIMENT

Figure 3:
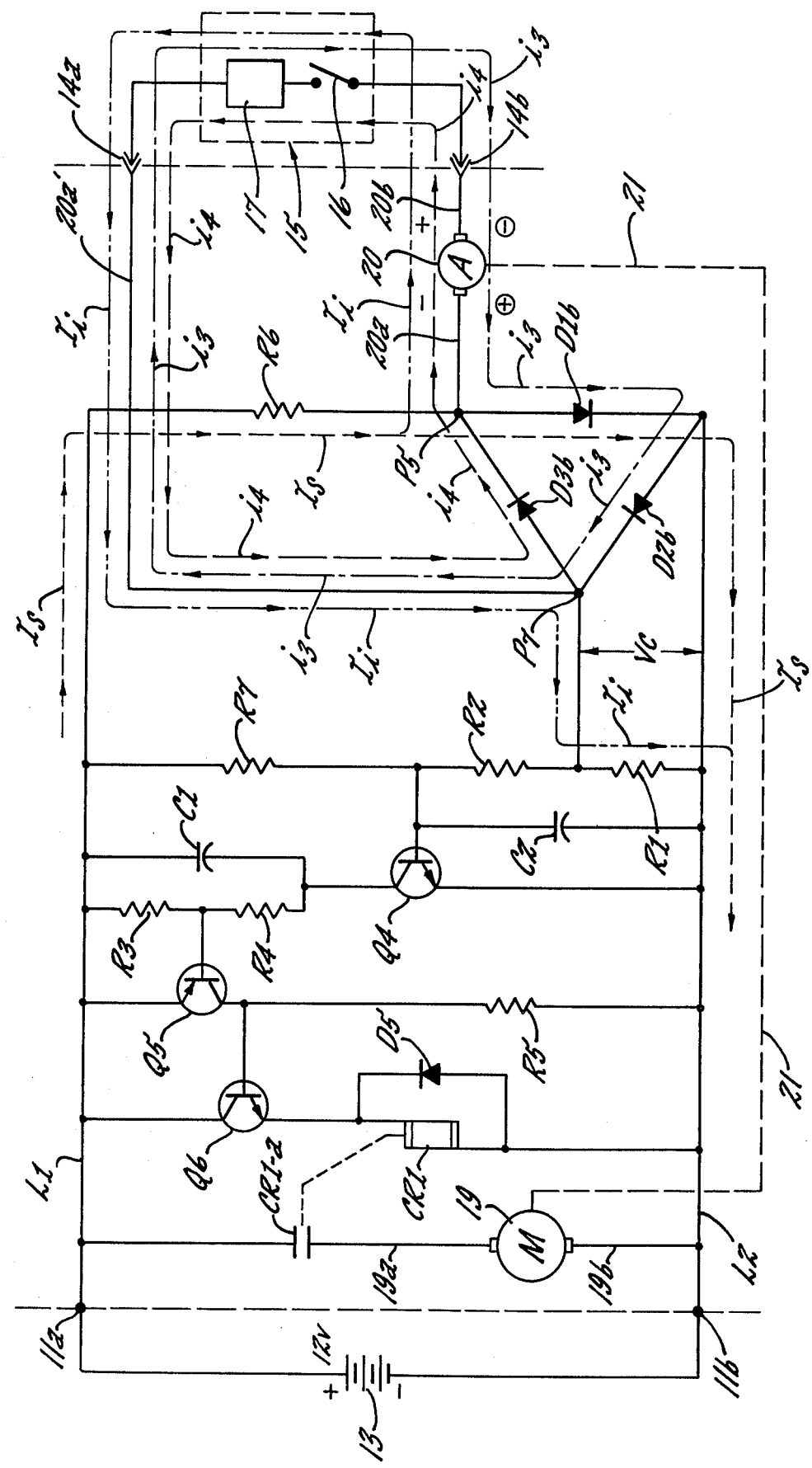
FIGS. 3 and 3A, 3B, 3C are similar to FIGS. 2 and 2A–2C but illustrates a third embodiment.

Referring next to FIG. 3, the illustrated third embodiment is similar in organization and operation to that of FIG. 2, and like reference characters are used for like parts. The third embodiment differs in that it uses only three diodes D1$b$, D2$b$, D3$b$ instead of the four diodes D1$a$, D2$a$, D3$a$, D4$a$.

Figure 3A:
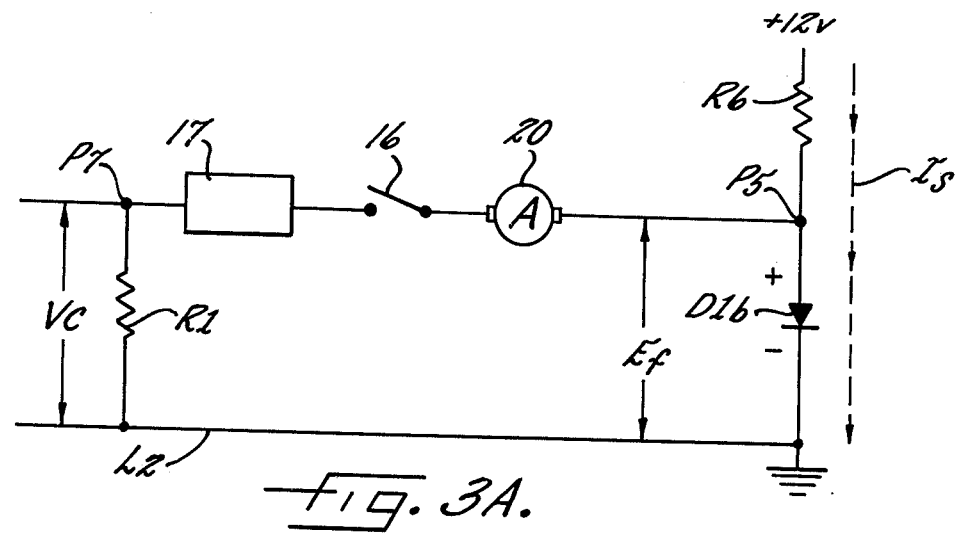

In FIG. 3, the resistor R6 and diode D1$b$, connected in series via lines L1, L2 across the battery 13, form a voltage divider in which there is, at standby, one forward voltage drop across the forwardly poled semiconductor junction of that diode which carries standby trickle current $I_s$. This produces the one forward drop Ef across diode D1$b$, as shown in FIG. 3A.

Figure 3B:
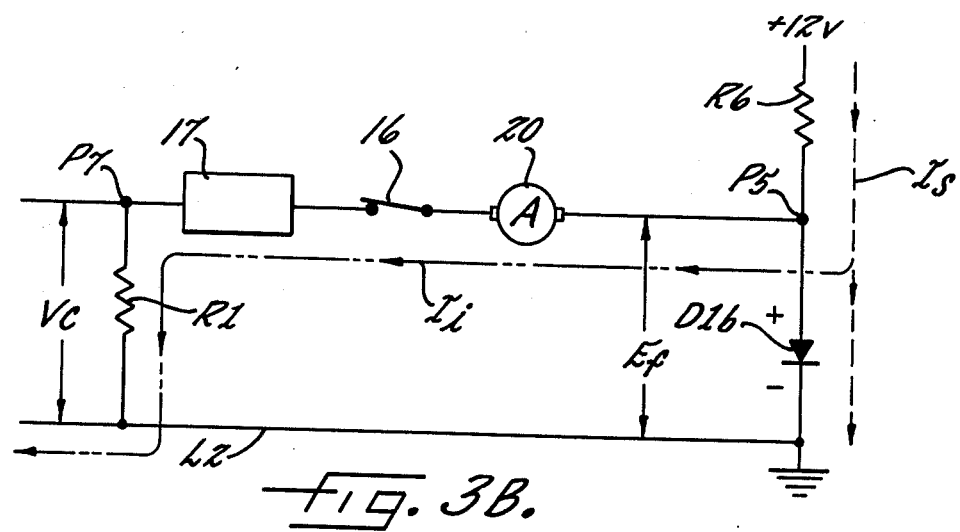

As a means for connecting the diode D1$b$ such that the voltage across it causes initial current $I_i$ to flow when the switch 16 is closed, the series combination of the alternator 20, switch 16 and unit 17 is connected (via output terminals 14$a$, 4$b$) between points P5 and P7. The signal resistor R1 extends between point P7 and line L2 — so that when the switch 16 is initially closed, dc. current $I_i$ (see also FIG. 3B) flows through 20, 16, 17 and R1 —to make Vc positive and greater than the base turn-on threshold for transistor Q4. Thus, the motor 19 is started automatically when switch 16 is closed.

Figure 3C:
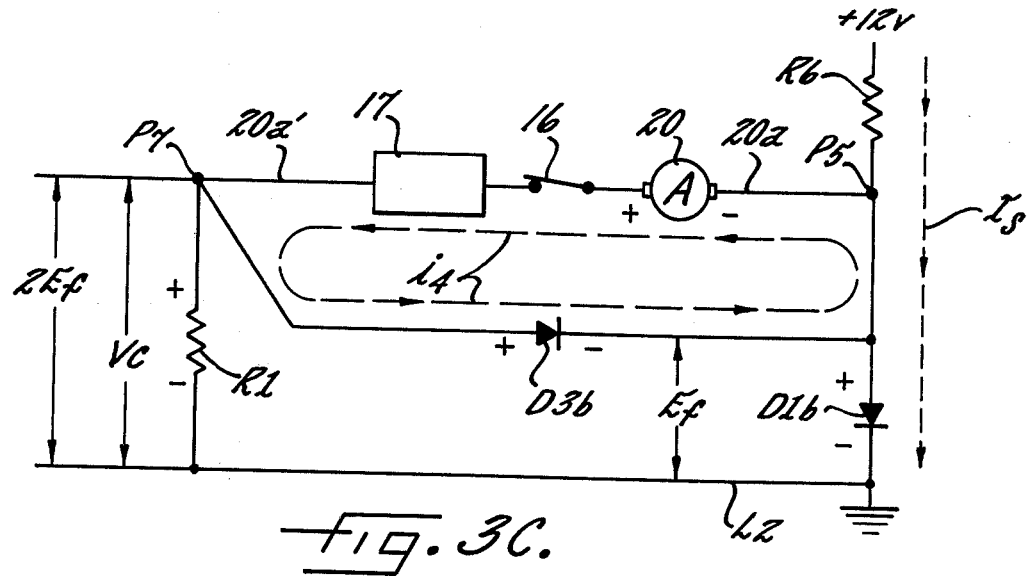

The permanently connected means for carrying the ac. load current, when the alternator is operating, are formed by the diodes D1$b$, D2$b$, D3$b$. At least one diode conducts the alternate half cycles of the ac. current forwardly. Observe from FIG. 3C that on positive half cycles, the alternator current $i_4$ flows through the switch 16, load unit 17, lead 20$a'$ and diode D3$b$ back to alternator lead 20$a$. The diode D2$b$ is reversely biased and non-conductive (so it is omitted from the simplified diagram in FIG. 3C) but the diode D1$b$ continues to carry the dc. standby current $I_s$ and so it remains forwardly conductive and has one forward drop thereacross. The positive half cycle current $i_4$ flows as labeled in FIGS. 3 and 3C —with the result that the control voltage Vc (across resistor R1 and appearing between point P7 and line L2) is positive and equal to two forward drops, i.e., the sum of the forward drop Ef across diode D1$b$ and the forward drop across diode D3$b$. The voltage across resistor R1 is thus 2Ef as labeled in FIG. 3C. This voltage (about 1.0 volts) exceeds the turn-on threshold for transistor Q4, and thus the motor 19 is maintained in its energized state.

Negative half cycles of ac. current $i_3$ flows forwardly through diodes D1$b$ and D2$b$ in series. The entire path is from alternator 20, lead 20$a$, P5, D1$b$, D2$b$, P7, 20$a$, 17, 16 and 20$b$ back to the alternator. Because resistor R1 is in parallel with diode D2$b$, the voltage Vc becomes negative in polarity and equal to one forward diode drop. This cuts off transistor Q4 during such negative half cycles, but the charge on capacitor C1 keeps the relay CR1 picked up as previously explained.

When switch 16 is later opened, then $i_3$, $i_4$ and $I_i$ all are interrupted, so the motor 19 is turned off. Thus, the arrangement of FIG. 3 operates with the advantages of FIG. 2, yet requires one less diode to carry ac. load current with negligible coupling of ac. current into the dc. circuit.

FOURTH EMBODIMENT

A fourth embodiment may be constructed by using a normally on, selectively turned-off transistor amplifier to control the motor 19. To the extent possible, the same reference characters are used for the fourth embodiment in FIG. 4 to identify like parts of FIGS. 1–3.

As shown in FIG. 4, a current limiting resistor and a forwardly poled semiconductor junction are connected between lines L1 and L2, and thus across battery 13, to draw a standby dc. trickle current. In this instance, however, that semiconductor junction is constituted by the base-emitter junction of a transistor Q7 in series with the current limiting resistor R6, standby current $I_s$ flowing therethrough and thus making the collector circuit of the transistor conductive or "normally on". So long as collector current flows through transistor Q7, it produces a voltage drop across a collector load resistor R9, thereby reducing the voltage Vc across the base-emitter junction of transistor Q4 and holding the latter non-conductive. This, in turn makes a PNP transistor Q9 non-conductive and leaves the relay coil CR1 deenergized the contacts CR1-$a$ open, and the motor 19 turned off. When standby current $I_s$ flows, therefore, transistor Q7 is turned on, but transistor Q4, Q9 and the motor 19 are off. Yet, the transistors Q4 and Q9, taken with the resistors R3, R4 and the capacitor C1 form a means responsive to steady or pulsating turn-off of transistor Q7 for energizing the motor 19. If the base-emitter current $I_s$ through Q7 is terminated (because the control voltage Vc' is reduced below the threshold of base-emitter conduction), then the reduction of current flow through resistor R9 increases the base voltage Vc for transistor Q4, and the collector of the latter conducts current through resistors R3 and R4 (thereby charging capacitor C1). This in turn renders transistor Q9 conductive, so relay CR1 picks up, and contacts CR1$a$ close to energize motor 19.

As in the previously described embodiments, means are provided in FIG. 4 to connect the alternator 20, load unit 17 and switch 16 to the semiconductor junction so that initial dc. current will flow when the switch is closed. As here shown, the lead 20$b$ is connected to the output terminal 14$a$ and the circuit continues through switch 16 and unit 17 to the ground line L2. The lead 20$a$ is connected to a tie point P8 which in turn is connected through a resistor R8 to the tie point P9 between the base of Q7 and the current limiting resistor R6. When switch 16 is closed, the voltage at point P9 drives initial current $I_i$ through R8, 20, 16, 17 to ground at L2 —which incidentally is connected to the second output terminal 14$b$.

Finally, the embodiment of FIG. 4 includes means for carrying the ac. current generated by the alternator 20 through the load, with alternate half cycles of such current passing forwardly through two respective semiconductor diodes. As here shown, first and second oppositely poled diodes D1$c$ and D2$c$ are connected in parallel between the tie point P8 (i.e., the output lead 20$a$) and the output terminal 14$b$ (i.e., the line L2). When the alternator 20 is operating, positive and negative half cycles of load current from the alternator pass forwardly through diodes D2$c$ and D1$c$, respectively. Those half cycles of current are respectively labeled $i_4$ and $i_3$ in FIG. 4.

Figure 4A:
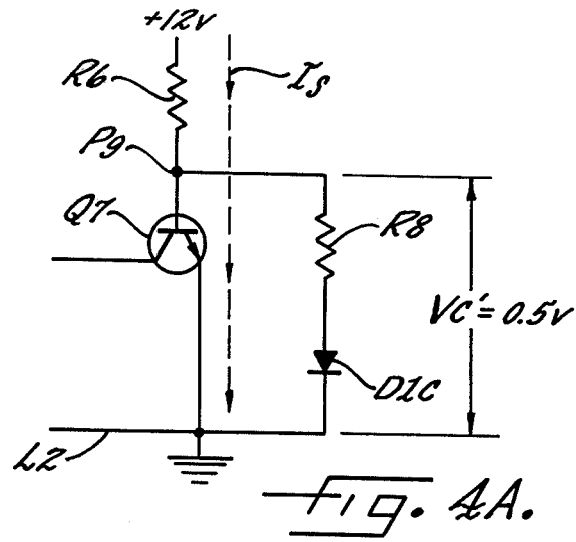
Figure 4B:
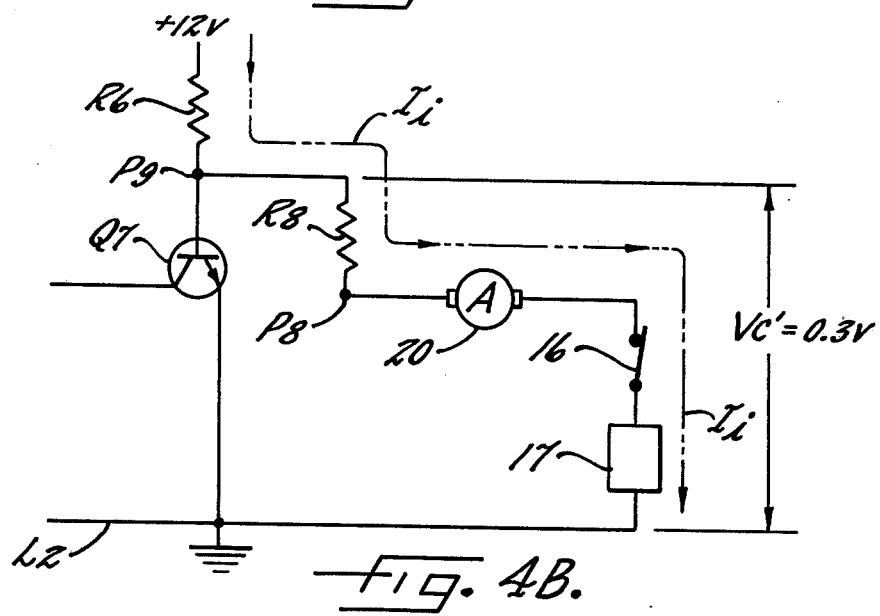
Figure 4C:
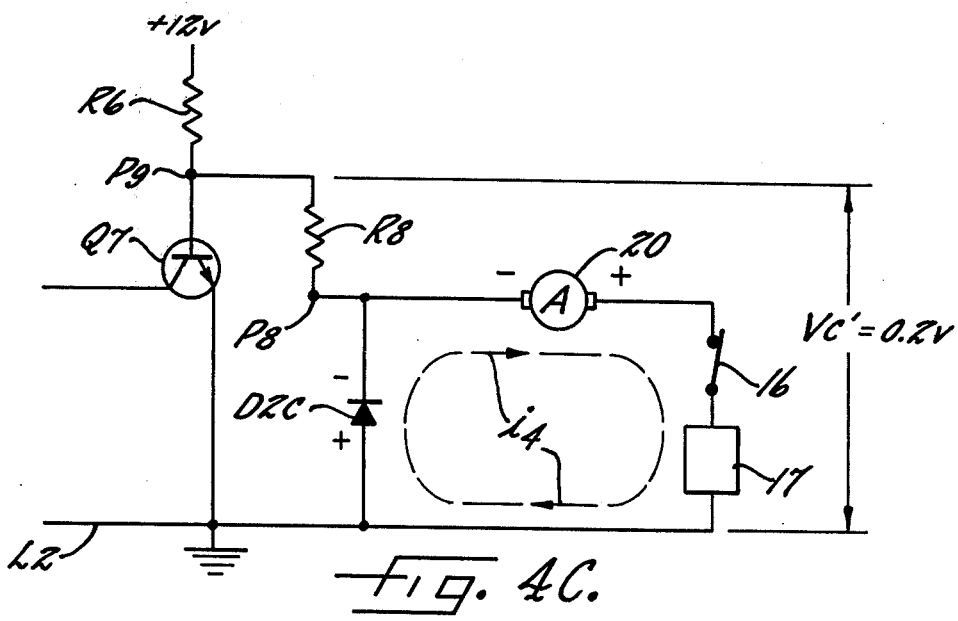

In operation, the system of FIG. 4 in the standby condition takes on the status which is indicated by fragmentary FIG. 4A. That is, the base-emitter junction of transistor Q7 carries standby current $I_s$ to cause a voltage drop across resistor R6 which makes the voltage Vc' equal to one forward drop (e.g., 0.5 volts) across that base-emitter junction. By making R6 relatively large (e.g., 100 K ohms), the standby current $I_s$ is merely a trickle. But with Q7 turned on, its collector conducts a second standby current $I_s'$ through resistor R9 (for example, 10 K ohms) thereby keeping transistors Q4 and Q9 turned off as previously explained. The sum of the two standby currents $I_s$ and $I_s'$ is so small as to produce an insignificant drain of the battery 13 even though they continue for many hours.

Because the switch 16 is open during standby, and the voltage Vc' (one forward drop) cannot exceed 0.5 volt, no current flows through resistor R8 and diode D1c. This results from the fact that the diode D1c appears essentially as an open circuit until the forward bias applied thereto exceeds a certain threshold, and the instant that such current tries to flow, the voltage drop through resistor R8 reduces the potential at tie point P8 below the level at which diode D1c will carry forward current. Therefore, in standby, and as FIG. 4A indicates, the standby current $I_s$ flows through the base-emitter of transistor Q7; the circuit appears as if the diode D2c, load device 15, and the alternator (as well as resistor R8 and D1c) were not present.

When the switch 16 is first closed, however, and before the motor 19 brings the alternator up to speed, a second path for initial current $I_i$ is created. Such dc. current flows, as indicated in fragmentary FIG. 4B, through resistor R6, resistor R8, alternator 20, switch 16 and unit 17 to line L2 (and thus back to the negative pole of battery 13). The alternator 20, unit 17 and switch 16 present a relatively low dc. resistance. Accordingly, the current $I_i$ is larger than the standby current $I_s$, and the increased voltage drop across resistor R6 pulls the potential of point P9 (voltage Vc') below about 0.4 volt. This is below the conduction threshold of the base-emitter junction in transistor Q7, so the base-emitter current ceases and the collector path is rendered non-conductive. The voltage drop across resistor R9 is thus reduced and the control voltage Vc increases — thereby turning on transistors Q4 and Q9 in the fashion already explained. The relay contacts CR1-a therefore close and the motor 19 starts. During this initial starting condition of the system, the diodes D1c and D2c are both non-conductive. The positive potential at point P9 tends to reverse bias the diode D2c so it cannot conduct; and the reduced voltage Vc' at point P9, taken with the voltage drop through resistor R8 due to the current $I_i$, is less than the forward threshold of diode D1c. Therefore, FIG. 4B accurately indicates that the system appears as if diodes D1c and D2c were not present. Transistor Q7 is turned off because its base-emitter voltage Vc' has been reduced below 0.4 volt.

As the alternator 20 accelerates and begins to generate an ac. voltage, current flows through the load unit 17. On positive half cycles (see FIG. 4C), that current $i_4$ passes forwardly through diode D2c and the system appears as if the reversely biased diode D1c were not there. But the forward current through diode D2c produces a forward voltage drop (0.5 volt) thereacross, making point P8 negative relative to the line L2. Accordingly, the current through resistors R6 and R8 increases above the value of $I_i$, and the potential (Vc') at junction P9 actually swings slightly negative, e.g., −0.2 volt. This pulsating forward drop across diode D2c thus affirmatively causes periodic cut off of transistor Q7 — thereby periodically turning on transistor Q4 to charge capacitor C1 and keep motor 19 energized. Since diode D1c is at this time reversely biased, it is validly omitted from the explanatory, fragmentary FIG. 4C.

On negative half cycles of the alternator voltage and load current, however, that current flows forwardly through diode D1c (FIG. 4) and diode D2c is cut off. The forward voltage drop across diode D1c raises the voltage level at P8 and P9 — and Vc' becomes sufficiently positive that the transistor Q7 turns on, making voltage Vc fall almost to zero and turning off transistor Q4. The transistor Q9 and motor 19 remain on, however, because of the previously established charge on capacitor C1, as explained above. Thus, while transistor Q7 turns off and on during operation of the alternator, the pulsating forward drop across diode D2c assures that it is alternately off and the capacitor C1 keeps the relay CR1 and the motor 19 steadily on.

When the operator of the load device opens switch 16, then the paths for current $i_4$, $i_3$ and $I_i$ are interrupted. The transistor Q7 turns on steadily (standby condition) and transistors Q4 and Q9 turn off, so the motor 19 is stopped.

PREVENTION OF TURN-OFF FAILURE DUE TO UNSWITCHED CAPACITANCE

The control system as embodied in any of the versions shown by FIGS. 1–4 will function reliably and accurately to start and stop the motor-alternator when the load device switch is closed or opened. It has been discovered, however, that in certain circumstances opening of the load switch 16 fails to result in turn-off of the motor 19. Analysis and experiments have revealed that such turn-off failure arises only in those cases where unswitched impedance is associated with the load device, because impedance creates a path for relatively small ac. current to continue to flow even after the load switch is opened. As a practical matter, such unswitched impedance which may be encountered is capacitive in nature, and it will be discussed in that way for purposes of explanation.

More particularly, in some applications of the present system the load device may have a self-contained radio interference filter 30 (FIG. 1D) which in effect, is formed by the parallel combination of a resistor 31 and a capacitor Cu connected across the unit 17 and the switch 16. The resistor 31 is generally of such high value (on the order of one megohm) that it can be ignored. But the capacitor Cu, while of low microfarad value, does constitute a path in which some ac. current from the alternator may flow even after the switch 16 has been opened. This condition is depicted in the partial schematic diagram of FIG. 1E — where it is assumed that the alternator 20 is running, and that the load switch 16 has just been opened (so that such switch and the load unit 17 are effectively not present). The filter resistor 31 of FIG. 1D is omitted from FIG. 1E because that resistor is very high in value and thus of negligible effect. The unswitched capacitor Cu therefore appears as a reactive impedance load across the output terminals of the converter, and it conducts alternate half cycles $i_4$, $i_3$ of ac. current — which, as in the case of FIG. 1, flow forwardly through diodes D4, D1 and diodes D2, D3, respectively. The magnitude of the ac. currents $i_4$ and $i_3$ is relatively small, compared to their magnitudes when the load switch 16 is closed, because the capacitor Cu is relatively low in value and its impedance is much greater than the impedance of the load unit 17. Yet, the ac. positive half cycle voltage from the alternator 20 applied to the capacitor Cu and diodes D4 and D1 in series causes the current $i_4$ to flow forwardly through those diodes, and this makes the voltage Vc have a positive value of three forward voltage drops (e.g., +1.5 volts) as explained above with reference to FIG. 1. The transistor Q1 of FIG. 1 is turned on at a rate of 60 times per second, and this is sufficient to keep the relay CR1 and the motor energized —even though switch 16 is open. This situation is here called "turn-off failure" because the motor fails to turn off when the load device 15 is turned off.

FIGS. 1D and 1E therefore explain the possible difficulty of turn-off failure. If unswitched capacity exits across the load device 15, then after the switch 16 has been closed and the motor-alternator brought up to speed to power the load unit 17, and if the switch 16 is then opened —the motor 19 simply keeps on running. This problem may arise also in cases where the load device 15 is connected to the converter output terminals 14a, 14b by a very long extension cord. The distributed stray capacitance between the extension cord wires appears, in effect, exactly as a small capacitor Cu (FIG. 1E) across the series combination of the load unit 17 and switch 16.

In keeping with another feature of the present invention, turn-off failure of the control system is prevented by means which reduce the control signal Vc when the load switch is opened, and despite the fact that unswitched capacitance permits ac. current to continue to flow from the rotating alternator. FIGS. 1D and 1F illustrate such preventing means applied to the embodiment of FIG. 1.

Referring to FIGS. 1D and 1F, an impedance element is added to the basic circuitry of FIG. 1 to form, with the impedance of the unswitched capacitor Cu, a voltage divider which makes the ac. voltage of the alternator 20 appear principally across the capacitor Cu and only a small fraction thereof across the impedance element. The latter element is also connected to the signal resistor R1 in a fashion such that the positive pulsations of the voltage Vc do not exceed the turn-on threshold of the responsive transistor Q1. As here shown, this is accomplished by an impedance element in the form of a capacitor C3 connected between the tie points P1 and P3 and sized for example to be on the order of 500 times greater in microfarad value than the unswitched capacitance Cu. As indicated by the identical but rearranged fragmentary schematic of FIG. 1F, the capacitor (and the reactive impedance formed thereby) is connected across diode D1 and D4; or in another sense, it is in series with the capacitor Cu and the alternator 20.

Consider now the operation of FIGS. 1D and 1E, assuming that the alternator 20 and its driving motor are running at rated speed and the switch 16 has just been opened to remove the load unit 17 from the circuit. Taking, as an example, the alternator voltage to be 120 vac., the peak value of that voltage on positive half cycle will be $120 \times 1.41 = 173$ volts. This peak voltage appears across the series combination of Cu and C3. If the ratio of Cu/C3 is about 1/500, then their reactive impedances will have a ratio Xu/X3 of about 500/1. The voltage dividing action of such impedances (in the series circuit of 20, Cu and C3) will result in the peak positive half cycle voltage across capacitor C3 having a value of $$173 \cdot \frac{X3}{Xu + X3} = 173 \cdot \frac{1}{501} \cong 0.35 \text{ volts.}$$

Therefore, the voltage drop across capacitor C3 due to positive half cycle current $i_4$ under these conditions has a maximum value of approximately 0.35 volt —and this is insufficient to render the diode D4 appreciably forwardly conductive. D3 is reverse biased and non-conductive. Thus, the voltage Vc rises to a positive peak of less than 0.35 volt —which is less than the turn-on threshold for transistor Q1 (FIG. 1). In summary, the presence of the low impedance created by the capacitor C3 assures that the relay CR1 and motor 19 (FIG. 1) are turned off when the load switch 16 is opened —even though some ac. current continues to flow through the unswitched capacitance Cu immediately after the switch 16 opens.

The presence of capacitor C3 does not, however, adversely affect the operation of the system so long as the load switch 16 is closed and the alternator is supplying current to the unit 17. The impedance of the unit 17 is always relatively low in relation to that of the unswitched capacitance Cu, and when in parallel with Cu the resultant effective impedance is much lower than that of Cu. Therefore, with the load device operating, the voltage dividing action tries to make the ac. voltage across capacitor C3 much greater than 1.0 volts on the peaks of positive half cycles; but such voltage is limited or clamped to a value of about 1.0 volts due to forward conduction of the diodes D1 and D4.

On negative half cycles of the alternator voltage —just after switch 16 has been opened, as represented in FIG. 1F—, the voltage across capacitor C3 is limited by the voltage dividing action to a low value of about 0.35 volt. This makes the control voltage Vc swing negative and the transistor Q1 turn off during such negative half cycles —but this produces no change in the operation as originally described with reference to FIG. 1.

Finally, since the impedance element C3 added as shown in FIG. 1D is a capacitor, it has no adverse affect on the dc. standby current $I_s$ and the dc. initial current $I_i$ described with reference to FIG. 1. The capacitor during standby will simply charge to the one forward drop voltage which appears across diode D2.

Capacitor C3 as shown in FIG. 1D is therefore an advantageous addition to the circuitry of FIG. 1 to overcome the problem of turn-off failure.

Figure 2D:
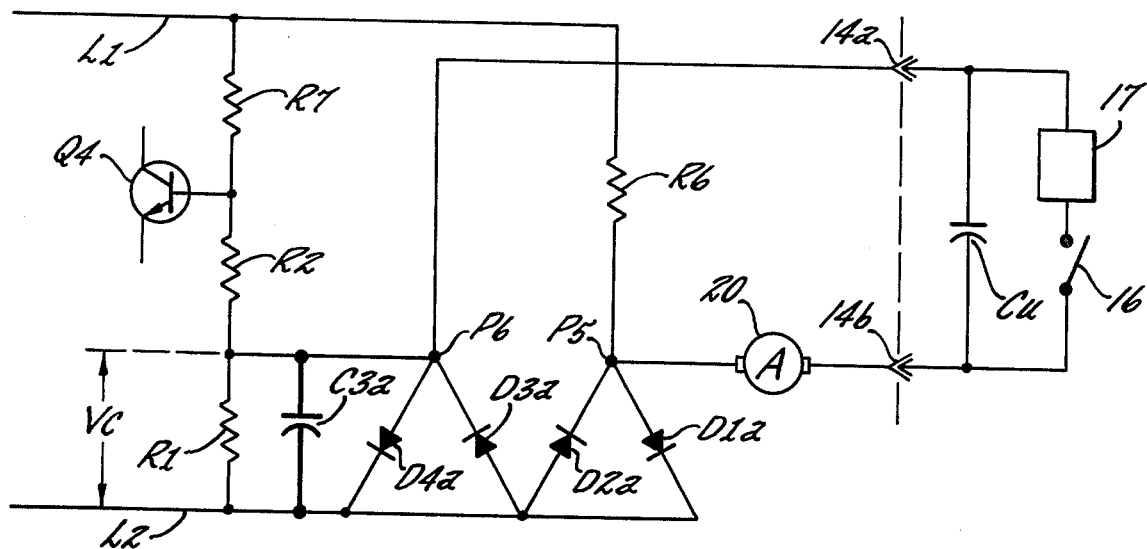
FIGS. 2D, 2E, 2F are similar to FIGS. 1D, 1E, 1F but show the addition of turn-off failure preventing means to the embodiment of FIG. 2.
Figure 2E:
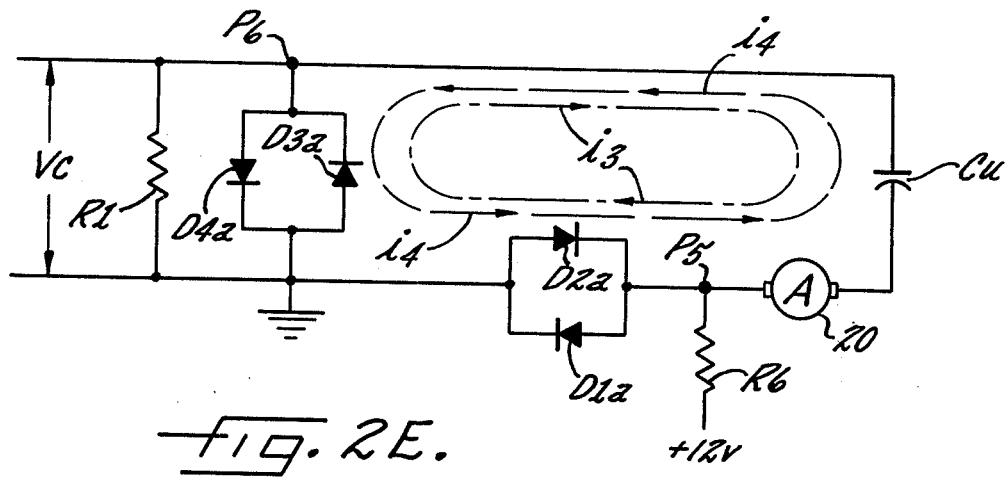

FIGS. 2D, E, F illustrate the turn-off failure preventing means as they may be added to the system of FIG. 2. More particularly, FIG. 2E illustrates the circuit of FIG. 2 if an unswitched capacitance Cu is associated with the load device, and just after the switch 16 has been opened. Alternating current $i_4$, $i_3$ may continue to flow through the capacitor Cu and diode D4a which makes the control voltage Vc periodically equal to about +0.5 volt. Thus, Q4 (FIG. 2) would continue to turn on periodically and the motor 19 in FIG. 2 would not turn off.

In preventing such turn-off failure, an impedance element in the form of a capacitor C3a is connected between tie point P6 and ground line L2, i.e., in parallel with both resistor R1 and diodes D4a and D3a, as shown in FIG. 2D.

Figure 2F:
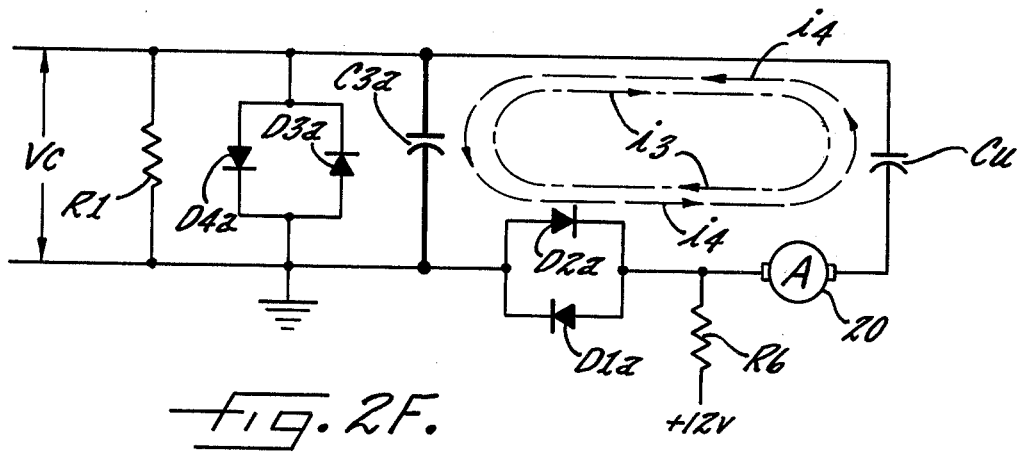

Fragmentary FIG. 2F confirms that the capacitor C3a is thus in a series circuit which includes alternator 20, and capacitor Cu (as well as the paralleled, oppositely poled diodes D2a and D1a). Again, capacitors Cu and C3a constitute reactive impedances which act to divide the peak voltage from the alternator on positive half cycles, and such that (when switch 16 is open and the alternator is still running) the voltage drop across capacitor C3a is less than the value which causes diode D4a to conduct significant forward current. In this way, the voltage Vc on positive alternator half cycles is reduced from +0.5 volt (when switch 16 is closed) to about 0.35 volt (when switch 16 is open) —the latter being below the turn-on threshold of transistor Q4.

As an example, let it be assumed that the peak positive half cycle voltage from the alternator 20 is 173 volts. The capacitor C3a is sized to be very large in relation to the capacitor Cu, e.g., the ratio Cu/C3a is about 1/500. When the current $i_4$ is flowing, it makes the diode D2a a forwardly conductive, so there is forward drop of about 0.5 volt across that diode. The voltage across the capacitor C3a thus becomes:

$$(173 - .5) \frac{X3}{Xu + X3} = 172.5 \times \frac{1}{501} \cong 0.34 \text{ volts}$$

This value of 0.34 volts is insufficient to make the diode D4a forwardly conductive, and capacitor C3a in effect shunts that diode. And this 0.34 volt becomes the value of Vc appearing across signal resistor R1 —a value which does not exceed the turn-on threshold of transistor Q4. Therefore, under the condition of the alternator 20 being driven by the motor 19, and the switch 16 just having been opened, the motor 19 is turned off —despite the fact that reduced alternating current $i_4$, $i_3$ continues to flow through the capacitor Cu.

The operation of the system of FIG. 2 during alternator negative half cycles is unaffected by the presence of the capacitor C3a, except of course the periodic negative values of the voltage Vc are reduced in magnitude. Also the standby condition, the motor starting operation, and the steady operation of the load device are not adversely affected —for the same reasons given above with reference to FIGS. 1D and 1F.

Figure 3D:
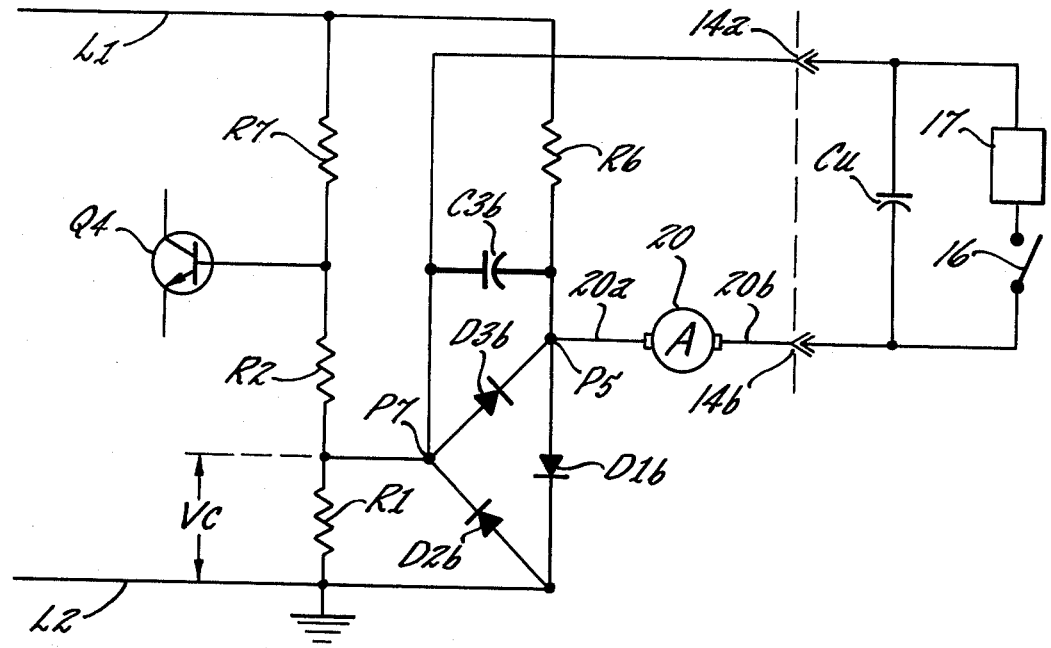
FIGS. 3D, 3E, 3F are similar to FIGS. 2D, 2E, 2F but show the addition of turn-off failure preventing means to the embodiment of FIG. 3.
Figure 3E:
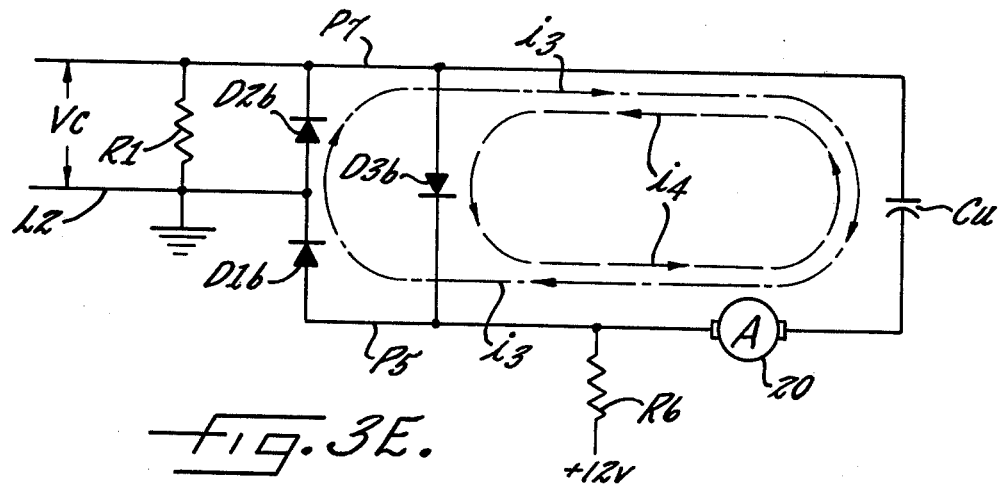
Figure 3F:
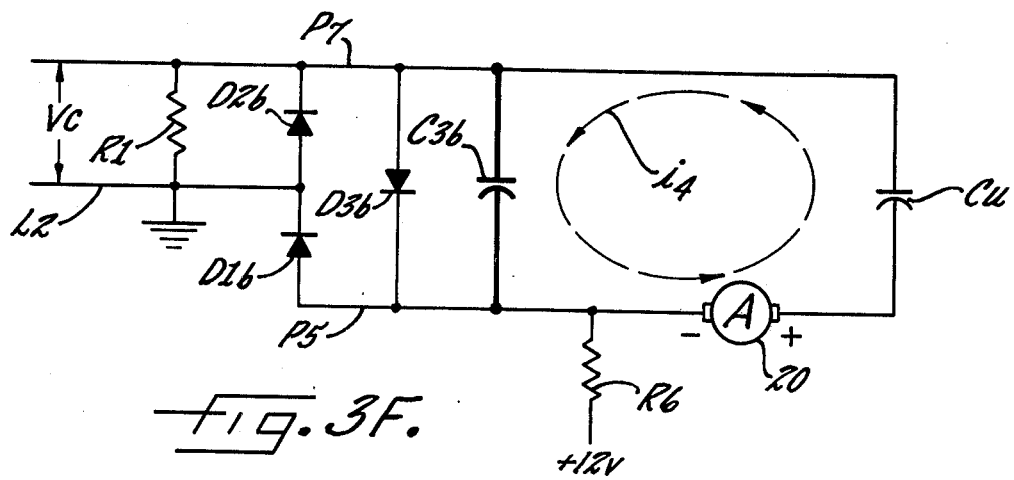

FIGS. 3D, 3E and 3F illustrate the addition of turn-off failure prevention means to the system of FIG. 3, in the same fashion that FIGS. 2D, 2E and 2F illustrate such addition to the system of FIG. 2. FIG. 3E shows the conditions which prevail in FIG. 3 if the load device has unswitched capacitance Cu and immediately after the switch 16 has been opened (and while motor 19 and alternator 20 are still running). The presence of unswitched capacitance Cu permits the alternating half cycles of current $i_4$, $i_3$ to continue to flow, —the current $i_4$ passing through diode D3b to produce a periodic forward voltage drop thereacross, and so that the control voltage Vc across resistor R1 rises periodically to a positive two voltage drops (e.g., +1.0 volt). Without some preventive measure, the motor 19 would not be turned off.

In adapting the turn-off failure prevention means to FIG. 3, an impedance element here in the form of a capacitor C3b is connected between points P5 and P7 (FIG. 3D), that is, in parallel with the diode D3b. The size of the capacitor C3b is chosen such that its impedance X3 is on the order of 500 times less than the impedance of the capacitor Cu. As confirmed by the fragmentary schematic in FIG. 3F, the capacitors Cu and C3b are directly in series with the alternator 20. Thus, the peak output voltage of the alternator on positive half cycles divides and appears across the two capacitors with a voltage ratio the same as the impedance ratio. On positive half cycles of current $i_4$, when the peak alternator voltage is, for example, 173 volts, the voltage across capacitor C3b cannot be greater than about 0.35 volt; the diode D3b is not fully forwardly conductive; and the control voltage Vc across resistor R1 is materially less than 0.35 volt. The emitter-base threshold for turn-on of transistor Q4 is not exceeded, and Q4 does not periodically turn on (as it would under the conditions of FIG. 3E).

The standby and initial starting current $I_s$ and $I_i$ of the FIG. 3 system, having the added capacitor C3b shown in FIG. 3D, are not materially altered. And of course, the turn-off of transistor Q4 during the negative half cycles of current $i_3$ occurs as before. Thus, the preventing means embodied in the capacitor C3b of FIG. 1D results in reliable turn-off of the motor 19 —even when the unswitched capacitance Cu is present.

It will be recalled that in FIG. 4, the periodic forward voltage drop across diode D2c due to the positive half cycles of ac. current $i_3$ (when switch 16 is closed and the motor 19 is driving the alternator) makes the junction P8 -0.5 volt relative to the ground reference line L2. If, as shown in FIG. 4D, unswitched capacitance Cu is present in the load device 15, this same forward current could flow through the diode D2c after switch 16 is opened, causing the voltage Vc' to swing below 0.4 volts to cut off transistor Q7, thus making voltage Vc periodically reach the threshold for turn-on of transistor Q4 —thereby keeping relay CR1 and motor 19 energized.

Figure 4D:
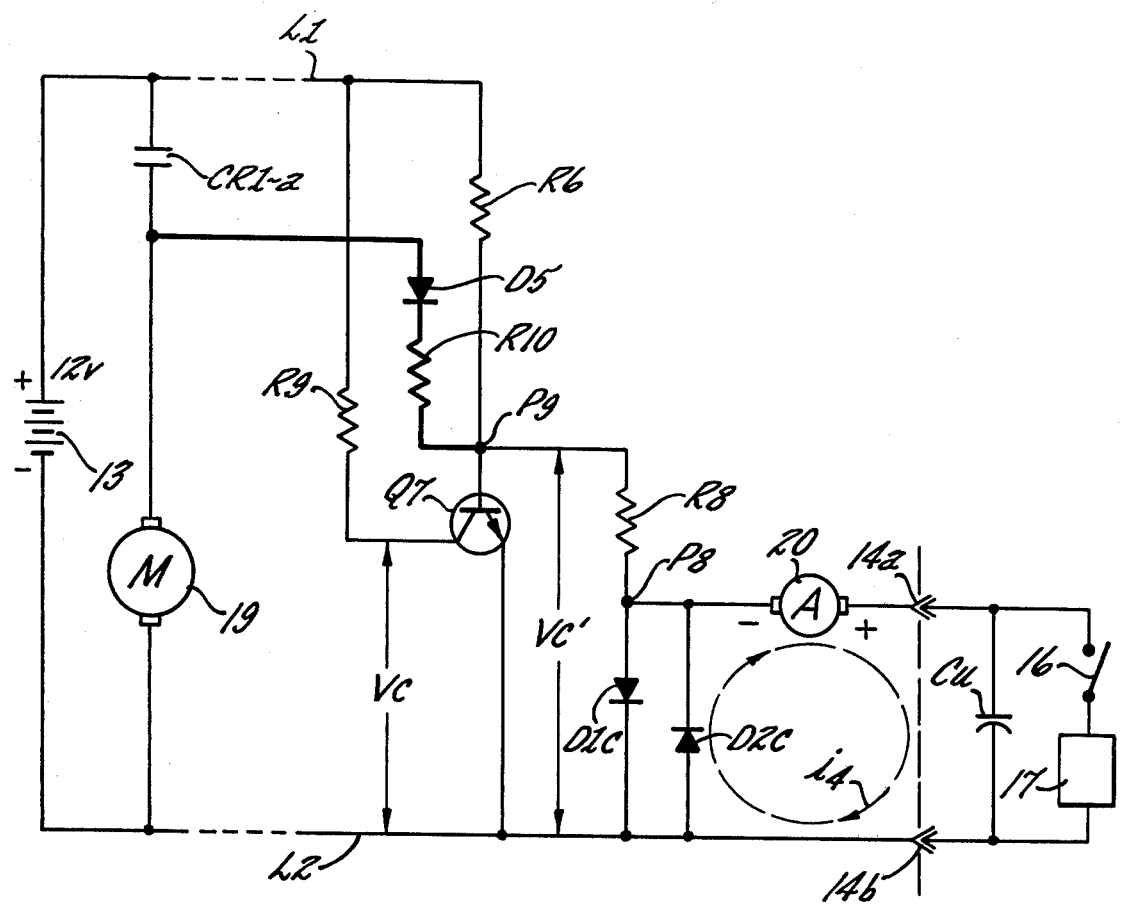
FIG. 4D is a fragmentary schematic diagram corresponding to FIG. 4 but showing turn-off failure preventing means added to the fourth embodiment.

To overcome this possibility of turn-off failure, means, shown in FIG. 4D as an isolating diode D5 and a resistor R10 are connected in series from the contacts CR1a to the tie point P9. The resistor R10 is effective only when and after the contacts CR1-a close, and the diode D5 prevents current flow via R6 and R10 through motor 19. When resistor R10 is operatively connected by closure of contacts CR1-a, it appears effectively as if it were in parallel with resistor R6, thereby changing the voltage divider action of R6, R8, alternator 20 and load unit 17 (assuming switch 16 is closed).

The initial current $I_i$ flows as described with reference to FIG. 4 when switch 16 is first closed (because contacts CR1-a are still open); and this reduces the voltage at point P9 to turn off Q7, turn on Q4 (FIG. 4), charge capacitor C1, pick up relay CR1 and start the motor 19. Once this happens, however, resistor R10 acts to reduce the effective value of the resistor R6, and the initial current $I_i$ increases in magnitude while the potential of point P9 tends to rise. As the alternator 20 builds up in speed and output voltage, however, the pulsating forward drop appears across diode D2c, so that the potential at point P9 is periodically reduced just below the conduction threshold of the base-emitter junction of transistor Q7. Therefore, as described originally, transistor Q7 is periodically turned off and on when ac. currents $i_4$ and $i_3$ flow forwardly through diodes D2c and D1c, but its base is not driven so far below the threshold turn-on potential.

Now, when switch 16 is opened, the circuit from point P9 through R8, alternator 20 and unit 17 is removed. The initial dc. current $I_i$ (which flows even during normal operation of the alternator 20 through the load 16, 17) now is reduced, and the pulsating voltage drop across diode D2c is insufficient to pull the potential at point P9 below the threshold of conduction for transistor Q7. Accordingly, the transistor Q7 is not periodically turned off; it conducts steadily to make the voltage Vc remain small —and so that relay R1 and motor 19 are de-energized.

In summary, the diode D5 and resistor R10 of FIG. 4D, when added to the system of FIG. 4, function to reduce the margin by which the normally conductive transistor Q7 is periodically turned off by the pulsating voltage drop appearing across the diode D2c when the alternator is supplying current to the load unit 17 via switch 16. When that switch is opened, and the capacitance Cu remains in the circuit to appear as a load of greatly increased impedance (and, in effect, greatly increased resistance to direct current), the pulsating forward drop across diode D2c is no longer sufficient to cause periodic cutoff of transistor Q7 —so the motor 19 is stopped.

AN ALTERNATIVE SOLUTION TO THE TURN-OFF FAILURE PROBLEM

The previously described arrangements for preventing turn-off failure will serve admirably in the four respective embodiments of the motor-alternator control system. In some instances, however, alternative solutions may be preferred— for example, to eliminate the expense and bulk of the capacitor C3, C3a or C3b. And with respect to FIG. 2D, the capacitor C3a is in parallel with the resistor R1 and must be charged by flow of initial current $I_i$ after switch 16 is closed, before the voltage Vc builds up to the conduction threshold of the transistor Q4. This introduces a perceptible delay between the instant the switch 16 is closed and the instant the motor 19 starts. Such delay is not harmful but may be puzzling or irritating to the user of the load device 15.

Figure 2G:
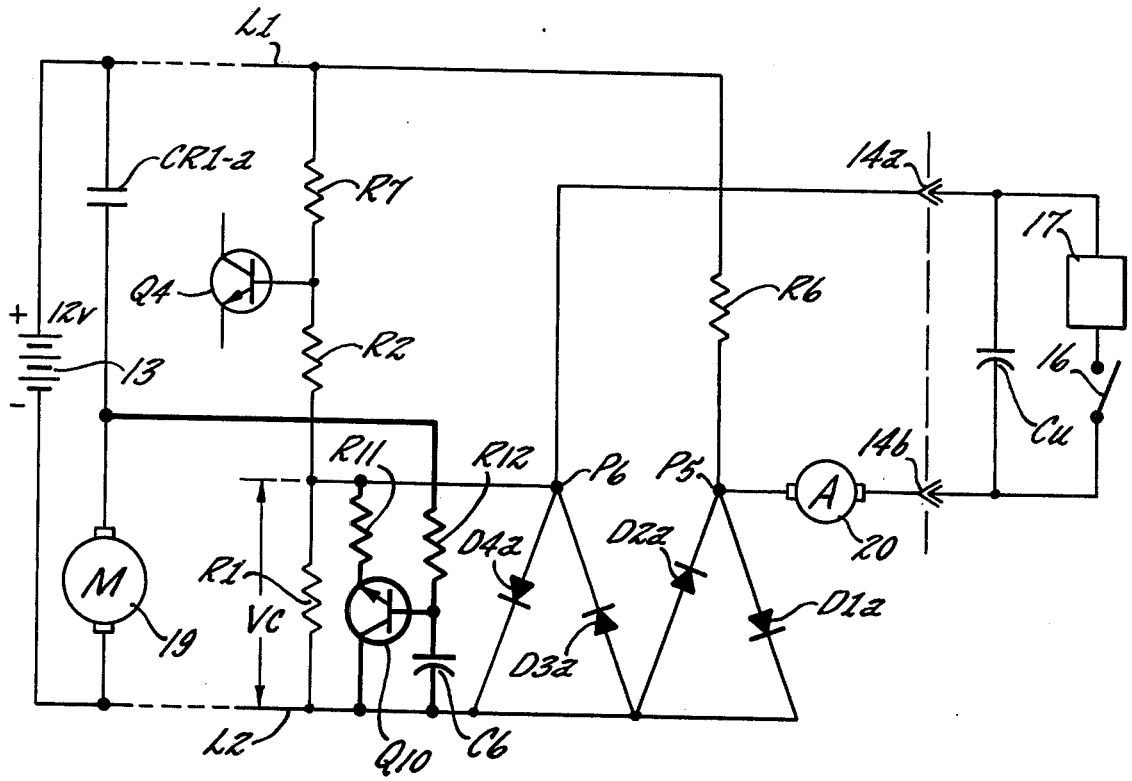
FIGS. 2G ad 2H are similar to FIGS. 1G and 1H but relate to an added turn-off preventing means in the embodiment of FIG. 2.
Figure 3G:
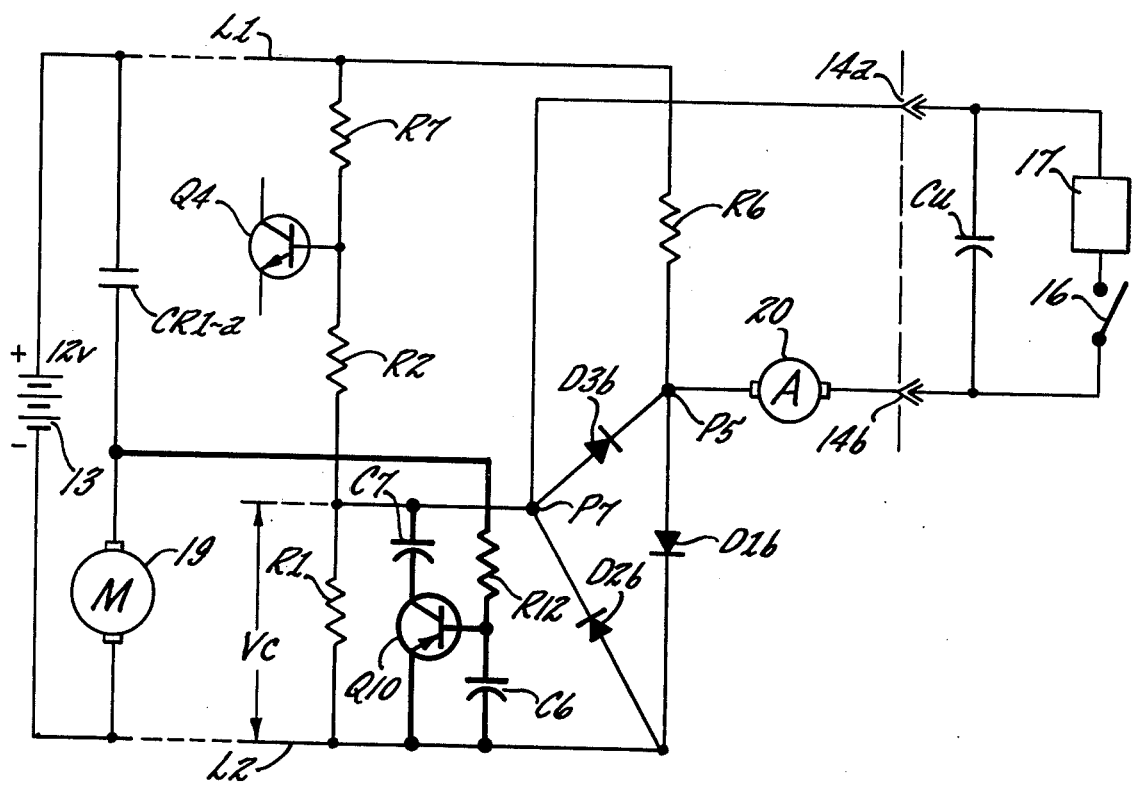
FIGS. 3G and 3H are similar to FIGS. 2G and 2H but relate to an added turn-off preventing means in the embodiment of FIG. 3.

As an alternative but similar solution to the turn-off failure problem, the preventive means shown by heavy lines in FIGS. 1G, 2G or 3G may be adopted, and these will next be individually described.

Referring to FIG. 1G, an impedance element is selectively switched so that it is, in effect, removed from or placed in parallel with the signal resistor R1. Although that element may be a capacitor, inductor or resistor, a relatively low-valued resistor R11 (low in relation to R1) is here connected in series with a controlled switching device between points P3 and P4, i.e., in parallel with resistor R1. The switching device is controlled such that it is non-conductive or conductive when the motor 19 is energized or de-energized; and it is here shown as a transistor Q10 of the type which conducts in both forward and inverse beta modes. As shown, the resistor R11 is in series with the collector-emitter path of the transistor Q10 between point P3 and the ground line L2. The effect of this is that, when Q10 is conductive, R11 is in parallel with R1 so that the latter appears as if it possesses a very greatly reduced resistance value.

To turn the transistor Q10 on or off, its base is connected via a current limiting resistor R12 to the relay contacts CR1-a. When the latter are closed to energize the motor 19, the connecting wire 35 is placed at the +12 L volt potential of line L1, and base-emitter current flows via resistor R12 to "turn on" the collector-emitter path of transistor Q10. The latter operates in both forward and inverse beta modes, i.e., it will conduct current from collector to emitter, or vice versa, whenever enabled by sufficient current through resistor R12. Absent such enabling current, the collector-emitter path appears essentially as an open switch.

Consider now that the arrangement of FIG. 1 with the addition of elements shown by heavy lines in FIG. 1G. The standby current $I_s$ will flow as above described. Closure of switch 16 will result in flow of initial current $I_i$ —but until contact CR1-a close, the resistor R11 and transistor Q10 have no effect because the latter is not turned on. The closure of switch 16 therefore causes turn-on of transistor Q1, charging of capacitor C1, turn-on of transistors Q3 and Q2 —and pick up of relay CR1 to close contacts CR1-a and energize the motor 19.

But as the motor is accelerating and the alternator voltage takes on its full rated value to send ac. current to the load unit 17, the transistor Q10 is enabled and resistor R11 is paralleled with resistor R1 to make the latter appear as if it were a much smaller resistance. If desired, a small capacitor C6 may be connected across the base-emitter of transistor Q10 so that the latter is not made conductive until the motor-alternator is up to full speed and rated output voltage.

Because the alternator is now producing rated voltage (120 vac.) and the load switch is closed, the impedance of the load unit 17 (with the capacitance Cu in parallel therewith) appears to be quite low. On positive half cycles of current $i_4$, an appreciable fraction (e.g., 5.0 volts) of the alternator voltage tends to appear across the parallel combination of R1 and R11. But of course, diodes D4 and D1 conduct the load current $i_4$ (and diode D2 is forwardly conducting standby current $I_s$) to limit the voltage Vc across R1 to a relatively low value of +1.5 volts, as previously explained. Thus, the effective presence of the resistor R11, with Q10 turned on, does not change the operation described above so long as the switch 16 remains closed and the load unit 17 is operating.

Now, if switch 16 is opened to turn off the load device, and if the unswitched capacitance Cu is present, ac. current ordinarily might continue to flow and transistor Q1 would periodically turn on. But since resistor R11, effective present, makes resistor R1 appear as if it has a value lower than its standby value, and since the impedance of the capacitor Cu is much higher than the impedance of Cu and unit 17 in parallel, the paralleled combination of R1 and R11 creates a low resistance portion of a voltage divider whose high impedance portion is formed by capacitance Cu. As designated in FIG. 1H, alternator 20 is in series with Cu and R1, R11 in parallel under these circumstances (the enabled transistor Q10 being symbolically represented as a closed switch Q10'). By choosing relative magnitudes, the low resistance of R1, R11 in parallel may be some 400 to 500 times less than the high impedance portion (impedance of Cu) of that voltage divider —so the resistors R1 and R11 carry the current $i_4$, and without developing sufficient voltage thereacross to render diode D4 forwardly conductive. In effect, diode D4 is reverse biased because its anode resides at less than one forward drop above ground (due to the low voltage across R1, R11) and its cathode resides at one full forward drop above ground (due to the standby current $I_s$ therethrough). Diode D2 in effect carries the current $i_4$ reversely since that diode is held in a conductive state by the standby dc. current $I_s$ flowing forwardly therethrough. Thus, the opening of switch 16 to leave the capacitance Cu alone as an ac. load reduces the positive, pulsating excusions of the voltage Vc to a low value on the order of 0.35 volt —and this eliminated periodic turn-on of transistor Q4, so the motor 19 is turned off.

Figure 2H:
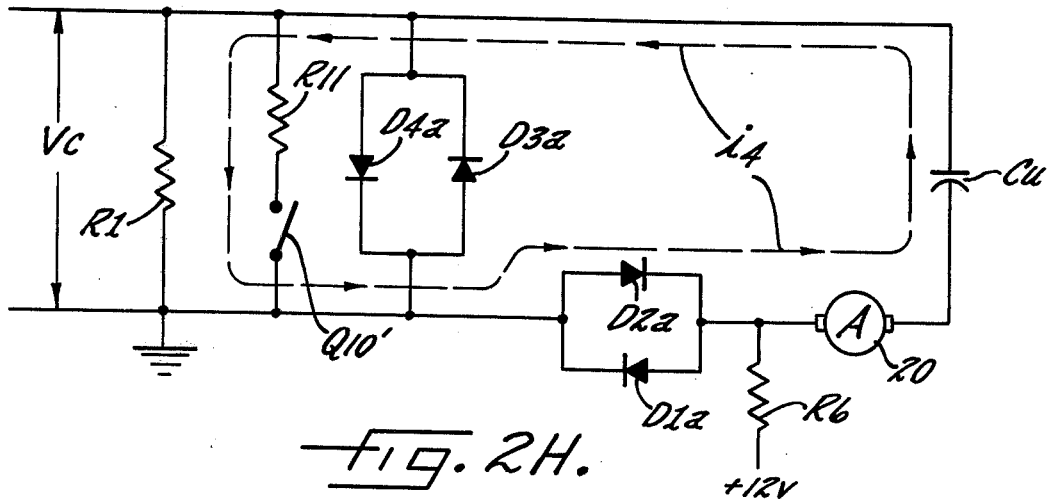

Referring next to FIG. 2G, the elements illustrated by heavy lines are added to the apparatus of FIG. 2 to prevent turn-off failure. Inasmuch as these elements involve an impedance and a controlled switching device connected in parallel with the signal resistor R1, they are designated by the same reference characters employed in FIG. 1G. The resistance R11 and the transistor Q10 operate in exactly the same way as described for FIG. 1G, and that need not be repeated. It will suffice to observe that FIG. 2H corresponds to a portion of FIG. 2G under the circumstances that switch 16 has just been opened and the motor-alternator is still running. On positive half cycles, current $i_4$ flows through Cu, R1 and R11 in parallel, and diode D2a. The impedance of R1 and R11 in parallel is some 400 to 500 times less than the impedance of capacitance Cu, so that the voltage drop Vc falls below 0.4 volt and transistor Q4 is not turned on during positive half cycles of the alternator. The diode D4a, which normally limits the voltage Vc to +0.5 volt, cannot conduct forwardly under these circumstances. Reliable turn-off of the motor 19 is achieved despite the presence of the unswitched capacitance Cu.

Figure 3H:
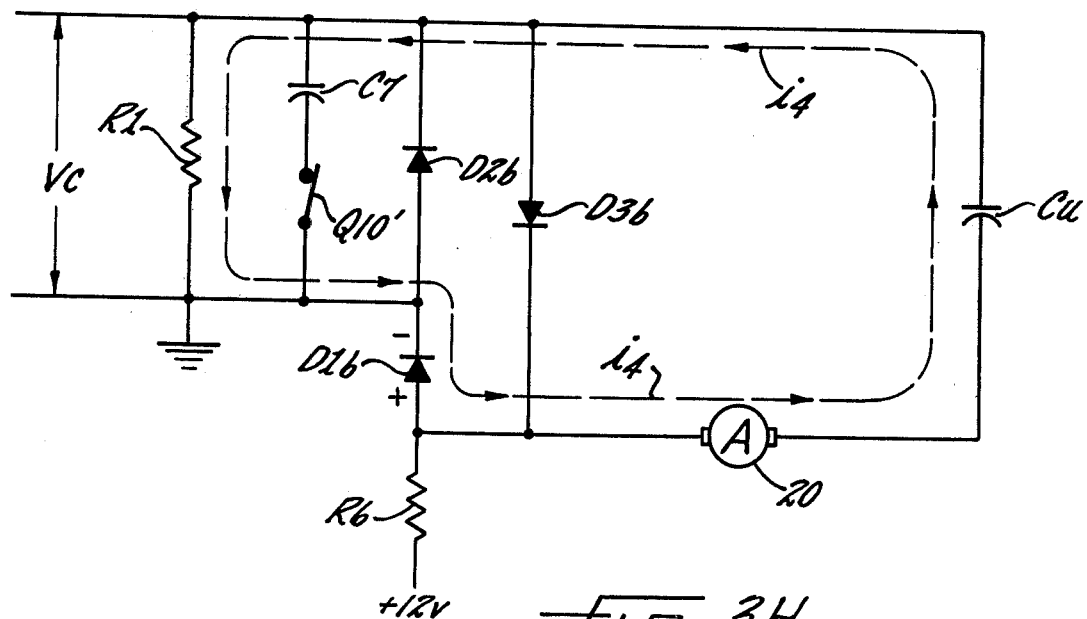

FIG. 3G shows by heavy lines a similar turn-off failure preventive means added to the embodiment of FIG. 3. In this instance the relatively low-valued impedance element, switched into and out of a parallel connection with resistor R1, is a large capacitor C7 used in lieu of the low-valued resistor R11 of FIGS. 1G and 2G. The transistor Q10, its base resistor R12 and the time delay capacitor C6 are the same as described for the latter figures. From what has been said above, it will be understood that such a modified form of FIG. 3 will create and respond to the standby and initial current $I_s$ and $I_i$ as previously explained, since the transistor Q10 appears as an open switch until after the contacts CR1-a close. Moreover, steady running of the motor 19 and the alternator to supply ac. current to the load device, with the switch 16 closed, will be the same. When the switch 16 is opened, however, the operative status of the FIG. 3G system is reflected in fragmentary FIG. 3H. This confirms that the alternator 20 is supplying its output voltage to the series combination of (a) capacitance Cu, (b) resistor R1 and capacitor C7 in parallel, and (c) the diode D1b which is at this time equivalent to a closed switch because it is biased into a conductive state by the forward current $I_s$ supplied via resistor R6 from the positive pole of battery 13.

Because of the impedance of R1 and C7 in parallel is on the order of 400 to 500 times less than the impedance presented by capacitance Cu, the voltage Vc is a small fraction of the peak positive half cycle alternator voltage which produces the current flow $i_4$. Thus, the diode D2b is reversely biased and non-conductive, and the voltage Vc is about +0.35 volt so transistor Q4 does not turn on. The voltage across diode D3b is the algebraic sum of 0.35 volt across R1 and the —0.5 volt from cathode to anode of diode D1b, making a reverse bias of about 0.15 volt. Diode D3b is therefore non-conductive to the current $i_4$ as a consequence of the capacitor C7 being in parallel with resistor R1 when only capacitor Cu is the effective load on the alternator. By the C7 and Q10 addition to FIG. 3, as represented in FIG. 3G, reliable turn-off of the motor 19 is obtained in response to opening of switch 16, even when the unswitched capacitance Cu is present.

In the foregoing descriptions, it has been mentioned that the values of C3, C3a, C3b (FIGS. 1D, 2D, 3D) are chosen in size such that they create impedances of about one five-hundredth of the value of the expected minimum value of the unswitched capacitance impedance. And with reference to FIGS. 1G, 2G, 3G it has been mentioned that the value of the switched impedance element R11 or C7 is chosen such that the impedance (or resistance) of the parallel combination thereof with the resistor R1 is about one four-hundredth to one five-hundredth of the expected value of the unswitched capacitance impedance. These ratios are examples to facilitate an understanding of the relationships involved —and they are based on the assumptions (a) that the alternator 20 produces an output voltage of 120 vac. (173 volts positive peak) and (b) that the base-emitter threshold of the transistor which responds to voltage Vc is not exceeded when Vc is about 0.35 volts. Of course, the present invention may be practiced with alternators having different rated output voltages (e.g., 240 volts), and with control means such as transistors with different specific turn-on thresholds. Therefore, it will be understood that the teachings here set out may in a broad sense be used if the impedance of C3, C3a or C3b is made low in relation to that of the unswitched capacitance, or the impedance of R1, R11 or R1, C7 as a parallel combination is made low in relation to that of the unswitched capacitance. Those skilled in the art will, from the present teachings, readily be able to determine and select the specific ratios of impedance, and the specific impedance values, which are the best in any particular application of the present invention.

I claim:

1. In a control system for starting and stopping a motor-alternator set, the motor being rotationally driven when energized from a dc. battery and the alternator being connected to supply ac. current to a load unit having a series on-off switch, the combination comprising:
   a. means including a current limiting resistor and a forwardly poled semiconductor junction adapted for connection across said battery to draw a standby dc. trickle current,
   b. means connecting said alternator, load unit and on-off switch to said semiconductor junction so that closure of said switch results in initial dc. current flow through the alternator, load unit and switch,
   c. means responsive to said initial dc. current flow for connecting said motor across said battery to energize and start the motor,
   d. permanently connected means for conducting ac. current, generated by said alternator, through said load unit and on-off switch, when closed, including at least two semiconductor diodes for respectively forwardly conducting the alternate half cycles of such current, and
   e. means responsive to the pulsating forward voltage drop across at least one of said diodes for maintaining said motor connected across said battery, whereby said motor is started or stopped automatically when said on-off switch is respectively closed or opened.

2. In a voltage inverter having input terminals adapted for connection to a battery and output terminals adapted for connection to an ac. load unit having an on-off switch, the combination comprising
   a. a motor-alternator set including a dc. motor having input leads and an alternator having output leads,
   b. switching means connected in a first circuit with said motor leads between said input terminals, so that the motor and switching means are in series with a battery when the latter is connected across said input terminals,
   c. means connecting said alternator output leads to respective ones of said output terminals, so that the alternator is in series with the load unit and its on-off switch when such unit is connected to said output terminals,
   d. means including a current limiting resistor and a forwardly poled semiconductor junction connected between said input terminals, so that a steady standby trickle current flows forwardly through said junction when a battery is connected across said input terminals,
   e. means connecting said output terminals via said alternator to said semiconductor junction so that closure of the on-off switch in the load unit connected to said output terminals results in initial dc. current flow in series through the alternator, said load unit and said on-of switch when the latter is closed,
   f. means responsive to said initial dc. current flow for actuating said switching means (a) and starting said motor,
   g. means forming a part of said means (c) and including at least two semiconductor diodes permanently connected to forwardly conduct load current in opposite directions during respective positive and negative half cycles of the ac. voltage generated by said alternator when said motor is running and said switch is closed, and
   h. means responsive to the forward voltage drop across at least one of said diodes due to ac. load current passing forwardly therethrough for maintaining said switching means (a) in an actuated state until said on-off switch is re-opened.

3. The combination set forth in claim 2 further characterized in that said means (h) includes
   h1. means responsive to the pulsating forward voltage drop across at least one of said two diodes for periodically charging a capacitor to create a dc. voltage signal,
   h2. means responsive to said voltage signal for maintaining said switching means (a) in an actuated state, and
   h3. means for permitting said capacitor to discharge so as to remove said dc. voltage signal when said pulsating forward voltage drop ceases to exist.

4. The combination set forth in claim 2 further characterized in that said means (e) includes means effective when said standby trickle current is flowing for creating a dc. voltage which is no greater than the forward voltage drop across said semiconductor junction, and means for applying said dc. voltage to the series combination of said alternator, said load unit and its on-off switch, whereby said initial dc. current flow is relatively low.

5. The combination set forth in claim 2 further characterized in that said semiconductor junction is constituted by one of said two semiconductor diodes.

6. A voltage inverter system comprising
   a. a dc. voltage source,
   b. a dc. motor,
   c. switching means connecting said motor across said source and actuatable to turn the motor on,
   d. an alternator mechanically coupled to said motor to be driven thereby,
   e. an ac. load unit including a series on-off switch,
   f. permanently connected means connecting said alternator to supply its output current through said load when the alternator is rotating and said on-off switch is closed,
   g. means including a current limiting resistor and a forwardly poled semiconductor junction connected across said source to draw standby trickle current,
   h. means for applying to the series combination of said alternator, load unit and on-off switch, when said standby current is flowing, a dc. voltage which is no greater than the forward drop across said semiconductor junction, whereupon closure of said on-off switch results in initial dc. current flow through said series combination,
   i. means responsive to said initial dc. current flow for actuating said switching means (a) and starting said motor,
   j. means forming a part of said means (f) and including at least two semiconductor diodes connected to conduct alternate half cycles of load current from said alternator when the latter is running and said switch is closed, and
   k. means responsive to the presence of the pulsating forward voltage drop across at least one of said diodes due to said load current for maintaining said switching means (a) in an actuated state,
   whereby said motor and alternator are automatically started or stopped when said on-off switch is closed or opened to turn the load unit on or off.

7. The combination set forth in claim 2 further characterized in that said means (e) includes
   e1. means establishing a series circuit which includes said alternator, said load unit and said switch across said semiconductor junction, and wherein the forward drop across said junction due to said standby current drives said initial current flow through said series circuit.

8. A voltage inverter system comprising
   a. a dc. voltage source,
   b. a dc. motor-alternator set,
   c. switching means connecting said motor across said source and actuatable to turn the motor on,
   d. an ac. load unit including a series on-off switch,
   e. permanently connected means connecting said alternator to supply its output current through said load unit when the alternator is rotating and said on-off switch is closed,
   f. means including a current limiting resistor and a forwardly poled first semiconductor diode connected across said source to draw standby trickle current,
   g. means responsive to the forward voltage drop across said diode due to said standby current for driving initial dc. current flow through said alternator, load unit and its on-off switch when the latter is closed and the alternator is not rotating, h. means responsive to said initial current flow for actuating said switching means (c) to turn on said motor, i. means forming a part of said means (e) and including at least said first diode and a second semiconductor diode for conducting load current from said alternator when the latter is running, said first and second diodes carrying said load current forwardly on the respective opposite half cycles of the alternator voltage, and j. means responsive to the pulsating forward voltage drop across one of said diodes due to load current for maintaining said switching means (d) in an actuated state, whereby said motor generator set automatically starts or stops when said on-off switch is respectively opened or closed.

9. In a control system for starting and stopping a motor-alternator set coupled to supply ac. power to a load unit having an on-off switch, said motor being rotationally driven when energized from a dc. source, the combination comprising:

means establishing a voltage divider adapted for connection to the terminals of said dc. source, said divider including the series combination of a. a current limiting resistor, b. a first diode poled to conduct current forwardly from said source, and c. a second diode poled to conduct current forwardly from said source so that a first tie point between said first and second diodes resides at one forward voltage drop above the potential of one of said dc. source terminals, third and fourth diodes, means for establishing a first series circuit from said first tie point through said alternator, switch, load unit and third diode to said one terminal, said third diode being reversely poled, means for establishing a second series circuit from said first tie point through said alternator, switch, load unit and fourth diode to a second tie point between said resistor and first diode, said fourth diode being forwardly poled, a conductive element connected from a third tie point between said third and fourth diodes to said one terminal, and means responsive to a steady or pulsating current flow in one direction through said element for connecting said motor across said dc. source, whereby closure or opening of said switch starts or stops said motor to cause said alternator to energize or de-energize said load.

10. In a control system associated with a. a motor-alternator set including a dc. motor drivingly connected to an alternator, b. first and second lines adapted for connection to the posts of a dc. voltage source, and c. first and second output terminals adapted for connection to an ac. load unit having a series on-off switch, the combination comprising:

1. a voltage divider connected between said first and second lines and including the series combination of:

i. a current limiting resistor, ii. a first diode poled to conduct current from said source and forming a first tie point with said resistor, and iii. a second diode poled to conduct current from said source and forming a second tie point with said first diode, 2. means connecting said alternator between said second tie point and said second output terminal, 3. a third diode connected between said second line and said first output terminal and poled to conduct in a direction from the former toward the latter, 4. a fourth diode connected between said first output terminal and said first tie point and poled to conduct in a direction from the former toward the latter, 5. a signal resistor in parallel with said third diode, and 6. means responsive to a steady or pulsating voltage drop of a given polarity across said signal resistor for connecting said dc. motor directly between said first and second lines, whereby closure or opening of said switch starts or stops said motor to cause said alternator to energize or de-energize said load unit.

11. In a control system associated with a. a motor-alternator set including a dc. motor drivingly connected to an alternator, b. first and second input lines adapted for connection to a dc. voltage source, and c. first and second output terminals adapted for connection to an ac. load unit having a series on-off switch, the improvement comprising in combination:

1. a voltage divider including a current limiting resistor and a forwardly poled first semiconductor diode connected in series across said input lines to draw a standby dc. trickle current from said source, 2. means connecting said alternator, said first diode and a signal resistor in series between said output terminals, whereby closure of the on-off switch in the connected load unit results in the forward voltage drop across said first diode driving initial dc. current through the alternator, load unit and signal resistor, 3. means responsive to initial current flow through said signal resistor for connecting said motor across said input lines to start the motor, 4. second and third semiconductor diodes connected directly across said signal resistor and oppositely poled such that the second is oriented reversely and the third is oriented forwardly with respect to said initial current, 5. a fourth semiconductor diode connected directly across said first diode but oriented with opposite polarity, whereby opposite half cycles of ac. current from the alternator through the connected load unit and its series switch, when closed, respectively flow forwardly (i) through said third and fourth diodes and (ii) through said first and second diodes, and 6. means responsive to the pulsating voltage across said signal resistor when said ac. current is flowing for maintaining the connection of said motor across said input lines, said pulsating voltage being alternately equal to plus and minus one diode forward drop, whereby said motor is started and stopped automatically when the switch of the connected load unit is respectively closed or opened.

12. In a control system with:
a. a motor-alternator set including a dc. motor drivingly connected to an alternator,
b. first and second input lines adapted for connection to a dc. voltage source, and
c. first and second output terminals adapted for connection to an ac. load unit having a series on-off switch, the improvement comprising in combination:
1. a voltage divider including a current limiting resistor and a forwardly poled first semiconductor diode connected in series across said input lines to draw a standby dc. trickle current from said source,
2. means connecting said alternator, said first diode and a signal resistor in series between said output terminals, whereby closure of the on-off switch in the connected load units results in the forward voltage drop across said first diode driving initial dc. current through the alternator, load unit and signal resistor,
3. means responsive to initial current flow through said signal resistor for connecting said motor across said input lines to start the motor,
4. a second semiconductor diode in parallel with said signal resistor and reversely poled with respect to the flow of said initial current,
5. a third semiconductor diode connected across the series combination of said first and second diodes, said third diode being poled to conduct current forwardly from one of said output terminals through said alternator to the other output terminal,
whereby opposite half cycles of ac. current from the alternator through the connected load unit and its series switch, when closed, respectively flow forwardly (i) through said third diode and (ii) through said first and second diodes, and
6. means responsive to the pulsating voltage across said signal resistor when said ac. current is flowing for maintaining the connection of said motor across said input lines,
whereby said motor is started or stopped when the switch of the connected load unit is respectively closed or opened.

13. In a control system associated with
a. a motor-alternator set including a dc. motor drivingly connected to an alternator,
b. first and secnd input lines adapted for connection to a dc. voltage source, and
c. first and second output terminals adapted for connection to an ac. load unit having a series on-off switch, the improvement comprising in combination:
1. a semiconductor transistor having base-emitter and collector-base junctions,
2. means connecting a current limiting resistor and said base-emitter junction, forwardly poled, in series across said input lines to draw a standby dc. trickle current from said source which turns on the collector-base junction of said transistor,
3. means responsive to steady or pulsating turn-off of said transistor for connecting said motor between said first and second input lines to energize the motor from said dc. source,
4. means connecting a first output lead of said alternator to said first output terminal and the second output lead of said alternator to the tie point between said limiting resistor and said base-emitter junction,
5. means connecting said second output terminal to the opposite side of said base emitter junction,
whereby closure of the on-off switch in a connected load device draws initial dc. current through said current limiting resistor and the load unit to reduce the potential across said base-emitter junction and turn off said transistor, thereby causing said means (3) to start said motor, and
6. first and second parallel, oppositely poled semiconductor diodes connected between said second output lead and said second output terminal,
whereby said first and second diodes respectively conduct forwardly the opposite half cycles of ac. current driven by the rotating alternator through the load unit, and said transistor is turned off during those half cycles of ac. current which pass through the alternator in the same direction as said initial current, thereby causing said means (3) to maintain energization of said motor so long as said on-off switch remains closed.

14. The combination set forth in claim 1 further characterized in that
said means (e) is responsive to said pulsating forward drop exceeding in magnitude a predetermined threshold level for maintaining said motor connected across said battery and further including
means for reducing the magnitude of said pulsating voltage below said threshold level when said switch is open but ac. current is driven by said alternator through unswitched impedance existing across said load unit and switch, said impedance being substantially greater than that of the load unit.

15. The combination set forth in claim 2 further characterized in that
said means (h) is responsive to a pulsating voltage exceeding in magnitude a predetermined threshold level which is less than the forward pulsating voltage drop across said at least one diode due to ac. load current, and further including
means for reducing said pulsating voltage applied to said means (h) below said threshold level when said switch is open but ac. current is driven by said alternator through unswitched impedance existing across said load unit and switch, said impedance being substantially greater than that of the load unit.

16. The combination set forth in claim 1 further characterized by means to prevent turn-off failure which may arise from unswitched impedance across the series combination of said load unit and on-off switch,
said preventing means including an impedance element connected in a series circuit which includes said alternator and said unswitched impedance,
said impedance element being connected also in parallel across at least one of said two semiconductor diodes,
the impedance value of said element being low in relation to said unswitched impedance at the normal frequency of said alternator, and forming with said impedance a voltage divider,
whereby opening of said on-off switch results in reduction of the amplitude of the pulsating voltage drop to which said means (e) is responsive, and the motor is turned off.

17. The invention defined in claim 16 wherein said impedance element is a capacitor.

18. The invention defined in claim 16 and further including means for connecting and disconnecting said impedance element in parallel across at least one of said diodes when said motor is respectively energized or de-energized.

19. The invention defined in claim 18 wherein said impedance element is a capacitor.

20. The invention defined in claim 18 wherein said impedance element is a resistor.

21. The combination set forth in claim 8 further including means for preventing turn-off failure which may arise from the presence of unswitched impedance across said load unit and its switch,
    said preventing means comprising an impedance element which is low in impedance value relative to said unswitched impedance,
    means for connecting said impedance element, at least whenever said motor is energized, in a series circuit with said alternator and also in a path which parallels at least one of said first and second diodes,
    said element forming with said unswitched impedance an␣a.c. voltage divider which, when said on-off switch is opened, reduces the voltage drop across said one diode and results in deactuation of said switching means (d).

22. The combination set forth in claim 9 further including means for preventing turn-off failure which may arise due to unswitched impedance across said load unit and its switch,
    said preventing means comprising a capacitor connected between said first and third tie points,
    said capacitor constituting an impedance which is small in value relative to the value of said unswitched impedance.

23. The combination set forth in claim 11 further including means for preventing turn-off failure which may arise due to unswitched impedance across said load unit and its switch,
    said preventing means comprising a capacitor connected in parallel with said signal resistor,
    said capacitor constituting an impedance which is small in value relative to the value of said unswitched capacitance.

24. The combination set forth in claim 12 further including means for preventing turn-off failure which may arise due to unswitched impedance across said load unit and its switch,
    said preventing means comprising a capacitor connected in parallel with said third diode,
    said capacitor constituting an impedance which is small in value relative to the value of said unswitched capacitance.

25. The combination set forth in claim 8 further characterized in that
    said means (g) includes a signal resistor through which said initial current flows,
    said means (h) is responsive to a control voltage, appearing across said signal resistor, exceeding a predetermined threshold level for actuating said switching means (c),
    said means (j) includes means for applying said pulsating forward voltage drop from across said one diode to said signal resistor so that the control voltage periodically exceeds said threshold level to maintain said switching means in an actuated state, and further including
    an impedance element of low impedance in relation to the resistance of said signal resistor,
    a switching device for selectively connecting said impedance element in parallel with said signal resistor, and
    means for actuating or deactuating said switching device automatically when said motor is energized or de-energized,
    said impedance element being sized to make the effective␣a.c. impedance of the parallel combination of such element and the signal resistor, greatly lower than an unswitched impedance which exists across the load unit and its switch, thereby to prevent said pulsating voltage from exceeding said threshold level when said switch is open.

26. The combination set forth in claim 25 wherein said impedance element is a resistor.

27. The combination set forth in claim 25 wherein said impedance element is a capacitor and said switching device is a transistor operable in the forward and inverse beta modes.

28. The combination set forth in claim 25, and further including means for delaying the actuation of said switching device for a short time interval after said motor is energized.

29. The combination set forth in claim 25 wherein said switching device is actuated and deactuated by the application or removal of a control signal thereto, and futher including means responsive to actuation or deactuation of said switching means (c) for applying or removing the control signal to said switching device.

* * * * *